(12) United States Patent
Katis et al.

(10) Patent No.: US 9,634,969 B2
(45) Date of Patent: *Apr. 25, 2017

(54) REAL-TIME MESSAGING METHOD AND APPARATUS

(71) Applicant: Voxer IP LLC, San Francisco, CA (US)

(72) Inventors: Thomas E. Katis, Jackson, WY (US); James T. Panttaja, San Francisco, CA (US); Mary G. Panttaja, San Francisco, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,746

(22) Filed: Apr. 6, 2016

(65) Prior Publication Data

US 2016/0234136 A1 Aug. 11, 2016

Related U.S. Application Data

(63) Continuation of application No. 14/839,266, filed on Aug. 28, 2015, now Pat. No. 9,338,113, which is a
(Continued)

(51) Int. Cl.
*H04L 12/58* (2006.01)
*H04L 29/06* (2006.01)
(Continued)

(52) U.S. Cl.
CPC .......... *H04L 51/10* (2013.01); *G06Q 10/107* (2013.01); *H04L 12/581* (2013.01); *H04L 45/34* (2013.01);
(Continued)

(58) Field of Classification Search
CPC ..... H04L 12/581; H04L 51/04; H04L 51/046; H04L 51/08; H04L 51/10; H04L 65/4069;
(Continued)

(56) References Cited

U.S. PATENT DOCUMENTS 4,807,224 A  2/1989 Naron et al.
5,117,422 A  5/1992 Hauptschein et al.
(Continued)

FOREIGN PATENT DOCUMENTS

CN  1393090 A  1/2003
CN  1852421  10/2006
(Continued)

OTHER PUBLICATIONS

"About Gmail," http://mail.google.com/mail/help/chat.html, Downloaded on Aug. 20, 2009, 3 pages.
(Continued)

*Primary Examiner* — Patrice Winder
(74) *Attorney, Agent, or Firm* — Beyer Law Group LLP

(57) ABSTRACT

A system and method for the late-biding of time-based media in real-time. With late binding, the sender may create time-based media before or at the same time an active delivery route to the recipient is discovered. As soon as the route becomes available, the media is transmitted. The existing DNS and email infrastructure is possibly used for route discovery, while any real-time transmission protocol may be used for the actual delivery of the media. "Progressive" emails may also be used for the real-time delivery of time-based media.

30 Claims, 11 Drawing Sheets

Related U.S. Application Data continuation of application No. 12/857,486, filed on Aug. 16, 2010, now Pat. No. 9,178,916, which is a continuation-in-part of application No. 12/419,861, filed on Apr. 7, 2009, now abandoned, said application No. 12/857,486 is a continuation-in-part of application No. 12/419,889, filed on Apr. 7, 2009, now abandoned, said application No. 12/857,486 is a continuation-in-part of application No. 12/419,914, filed on Apr. 7, 2009, now abandoned, said application No. 12/857,486 is a continuation-in-part of application No. 12/552,979, filed on Sep. 2, 2009, now Pat. No. 8,688,789, said application No. 12/857,486 is a continuation-in-part of application No. 12/552,980, filed on Sep. 2, 2009, now Pat. No. 8,645,477, said application No. 12/857,486 is a continuation-in-part of application No. 12/028,400, filed on Feb. 8, 2008, now Pat. No. 8,180,029.

(60) Provisional application No. 61/148,885, filed on Jan. 30, 2009, provisional application No. 60/937,552, filed on Jun. 28, 2007, provisional application No. 60/999,619, filed on Oct. 19, 2007.

(51) Int. Cl.
  *H04L 12/721* (2013.01)
  *H04L 29/10* (2006.01)
  *G06Q 10/10* (2012.01)
  *H04L 29/12* (2006.01)

(52) U.S. Cl.
  CPC ............ *H04L 51/04* (2013.01); *H04L 51/046* (2013.01); *H04L 51/08* (2013.01); *H04L 51/14* (2013.01); *H04L 61/1511* (2013.01); *H04L 61/2007* (2013.01); *H04L 65/1069* (2013.01); *H04L 65/4069* (2013.01); *H04L 65/4084* (2013.01); *H04L 67/42* (2013.01); *H04L 69/16* (2013.01); *H04L 29/12066* (2013.01); *H04L 29/12726* (2013.01); *H04L 61/307* (2013.01)

(58) Field of Classification Search
  CPC ..... H04L 51/14; H04L 45/34; H04L 61/2007; H04L 69/16; H04L 65/1069; H04L 61/307; H04L 61/1511; H04L 29/12726; H04L 29/12066; G06Q 10/107
  See application file for complete search history.

(56) References Cited

U.S. PATENT DOCUMENTS

| | | | |
|---|---|---|---|
| 5,128,932 A | 7/1992 | Li | |
| 5,283,818 A | 2/1994 | Klausner et al. | |
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,651,054 A | 7/1997 | Dunn et al. | |
| 5,692,213 A | 11/1997 | Goldberg et al. | |
| 5,734,963 A | 3/1998 | Fitzgerald et al. | |
| 5,737,011 A | 4/1998 | Lukacs | |
| 5,889,764 A | 3/1999 | Needham et al. | |
| 5,918,158 A | 6/1999 | LaPorta et al. | |
| 5,958,005 A | 9/1999 | Thorne et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,757 A | 8/2000 | Rhee | |
| 6,175,619 B1 | 1/2001 | DeSimone | |
| 6,212,535 B1 | 4/2001 | Weikart et al. | |
| 6,233,389 B1 | 5/2001 | Barton et al. | |
| 6,262,994 B1 | 7/2001 | Dirschedl et al. | |
| 6,335,966 B1 | 1/2002 | Toyoda | |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,594,693 B1 | 7/2003 | Borwankar et al. | |
| 6,671,732 B1 | 12/2003 | Weiner | |
| 6,700,902 B1 | 3/2004 | Meyer | |
| 6,717,925 B1 | 4/2004 | Leppisaari et al. | |
| 6,721,703 B2 | 4/2004 | Jackson et al. | |
| 6,721,784 B1 | 4/2004 | Leonard et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,002,973 B2 | 2/2006 | MeLampy et al. | |
| 7,039,040 B1 | 5/2006 | Burg | |
| 7,039,675 B1 | 5/2006 | Kato | |
| 7,039,761 B2 | 5/2006 | Wang et al. | |
| 7,047,030 B2 | 5/2006 | Forsyth | |
| 7,058,392 B1 | 6/2006 | Weinman, Jr. | |
| 7,082,164 B2 | 7/2006 | Chaddha | |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,228,359 B1 | 6/2007 | Monteiro | |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,277,453 B2 | 10/2007 | Chin et al. | |
| 7,283,809 B2 | 10/2007 | Weinman, Jr. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,339,937 B2 * | 3/2008 | Mitra | H04L 45/00 370/255 |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,415,284 B2 | 8/2008 | Hoover et al. | |
| 7,415,291 B1 | 8/2008 | Kirkpatrick | |
| 7,444,306 B2 | 10/2008 | Varble | |
| 7,626,951 B2 | 12/2009 | Croy et al. | |
| 7,634,652 B2 | 12/2009 | McEnroe et al. | |
| 7,656,836 B2 | 2/2010 | Baker et al. | |
| 7,719,975 B2 | 5/2010 | Mallet et al. | |
| 7,742,429 B1 | 6/2010 | Huang et al. | |
| 7,809,388 B1 | 10/2010 | Othmer | |
| 7,908,389 B2 * | 3/2011 | Zuckerman | H04L 29/08306 709/231 |
| 7,913,053 B1 | 3/2011 | Newland | |
| 7,957,363 B2 | 6/2011 | Deen et al. | |
| 7,970,918 B2 | 6/2011 | Thompson et al. | |
| 8,086,222 B2 | 12/2011 | Vaananen | |
| 8,099,512 B2 | 1/2012 | Katis et al. | |
| 8,121,270 B2 | 2/2012 | Katis et al. | |
| 8,130,921 B2 | 3/2012 | Katis et al. | |
| 8,175,234 B2 | 5/2012 | Katis et al. | |
| 8,180,029 B2 | 5/2012 | Katis et al. | |
| 8,180,030 B2 | 5/2012 | Katis et al. | |
| 8,243,894 B2 | 8/2012 | Katis et al. | |
| 8,271,003 B1 | 9/2012 | Othmer et al. | |

(56) References Cited

U.S. PATENT DOCUMENTS

| | | |
|---|---|---|
| 8,311,050 B2 | 11/2012 | Katis et al. |
| 8,345,836 B2 | 1/2013 | Katis et al. |
| 8,401,582 B2 | 3/2013 | Katis et al. |
| 8,401,583 B2 | 3/2013 | Katis et al. |
| 8,526,456 B2 | 9/2013 | Katis et al. |
| 8,532,270 B2 | 9/2013 | Katis et al. |
| 8,533,611 B2 | 9/2013 | Katis et al. |
| 8,559,319 B2 | 10/2013 | Katis et al. |
| 8,565,149 B2 | 10/2013 | Katis et al. |
| 8,645,477 B2 | 2/2014 | Katis et al. |
| 8,670,531 B2 | 3/2014 | Katis et al. |
| 8,687,779 B2 | 4/2014 | Katis et al. |
| 8,688,789 B2 | 4/2014 | Katis et al. |
| 8,693,647 B2 | 4/2014 | Katis et al. |
| 8,705,714 B2 | 4/2014 | Katis et al. |
| 8,744,050 B2 | 6/2014 | Katis et al. |
| 8,825,772 B2 | 9/2014 | Katis et al. |
| 8,832,299 B2 | 9/2014 | Katis et al. |
| 8,849,927 B2 | 9/2014 | Katis et al. |
| 8,902,749 B2 | 12/2014 | Katis et al. |
| 8,924,593 B2 | 12/2014 | Ranney |
| 8,948,354 B2 | 2/2015 | Katis et al. |
| 9,154,628 B2 | 10/2015 | Katis et al. |
| 9,178,916 B2 | 11/2015 | Katis et al. |
| 9,338,113 B2 | 5/2016 | Katis et al. |
| 9,456,087 B2 | 9/2016 | Katis et al. |
| 2001/0000540 A1 | 4/2001 | Cooper et al. |
| 2001/0025377 A1 | 9/2001 | Hinderks |
| 2001/0043602 A1 | 11/2001 | Brown |
| 2001/0049745 A1* | 12/2001 | Schoeffler ............... H04L 51/14 709/238 |
| 2001/0052019 A1 | 12/2001 | Walters et al. |
| 2002/0006802 A1 | 1/2002 | Saarela et al. |
| 2002/0016818 A1 | 2/2002 | Kirani et al. |
| 2002/0032799 A1 | 3/2002 | Wiedeman et al. |
| 2002/0067739 A1 | 6/2002 | Wilkes et al. |
| 2002/0091848 A1 | 7/2002 | Agresta et al. |
| 2002/0120666 A1 | 8/2002 | Landsman et al. |
| 2002/0126817 A1 | 9/2002 | Hariri et al. |
| 2002/0128029 A1 | 9/2002 | Nishikawa et al. |
| 2002/0143959 A1 | 10/2002 | El-Baze et al. |
| 2002/0150094 A1 | 10/2002 | Cheng et al. |
| 2002/0154745 A1 | 10/2002 | Shtivelman |
| 2002/0159600 A1 | 10/2002 | Weiner |
| 2002/0184368 A1 | 12/2002 | Wang |
| 2003/0027566 A1 | 2/2003 | Weiner |
| 2003/0028632 A1 | 2/2003 | Davis |
| 2003/0040301 A1 | 2/2003 | Fukuzato |
| 2003/0084106 A1 | 5/2003 | Erev et al. |
| 2003/0099198 A1 | 5/2003 | Kiremidjian et al. |
| 2003/0126162 A1 | 7/2003 | Yohe et al. |
| 2003/0163580 A1 | 8/2003 | Lee |
| 2003/0172233 A1 | 9/2003 | Mugitani et al. |
| 2003/0186722 A1 | 10/2003 | Weiner |
| 2003/0208543 A1 | 11/2003 | Enete et al. |
| 2003/0210265 A1 | 11/2003 | Haimberg |
| 2004/0017905 A1 | 1/2004 | Warrier et al. |
| 2004/0019539 A1 | 1/2004 | Raman et al. |
| 2004/0039839 A1* | 2/2004 | Kalyanaraman ........ H04L 45/34 709/238 |
| 2004/0045036 A1 | 3/2004 | Terasaki |
| 2004/0052218 A1 | 3/2004 | Knappe |
| 2004/0074448 A1 | 4/2004 | Bunt |
| 2004/0090959 A1 | 5/2004 | Cinghita et al. |
| 2004/0095900 A1 | 5/2004 | Siegel |
| 2004/0117722 A1 | 6/2004 | Harada |
| 2004/0125816 A1 | 7/2004 | Xu et al. |
| 2004/0127279 A1 | 7/2004 | Gatto et al. |
| 2004/0151158 A1 | 8/2004 | Gannage et al. |
| 2004/0170158 A1 | 9/2004 | Man-Hak Tso et al. |
| 2004/0192353 A1 | 9/2004 | Mason et al. |
| 2004/0192378 A1 | 9/2004 | Wulkan |
| 2004/0203670 A1 | 10/2004 | King et al. |
| 2004/0207724 A1 | 10/2004 | Crouch et al. |
| 2004/0207870 A1 | 10/2004 | Takahashi et al. |
| 2004/0213211 A1 | 10/2004 | Green et al. |
| 2004/0252679 A1 | 12/2004 | Williams et al. |
| 2004/0255148 A1 | 12/2004 | Monteiro et al. |
| 2004/0258220 A1 | 12/2004 | Levine et al. |
| 2005/0020246 A1 | 1/2005 | Kang |
| 2005/0021819 A1 | 1/2005 | Kilkki |
| 2005/0025308 A1 | 2/2005 | Tischer et al. |
| 2005/0030932 A1 | 2/2005 | Kelly et al. |
| 2005/0037706 A1 | 2/2005 | Settle |
| 2005/0053033 A1 | 3/2005 | Kelly et al. |
| 2005/0058070 A1 | 3/2005 | Burghardt et al. |
| 2005/0076084 A1 | 4/2005 | Loughmiller et al. |
| 2005/0102358 A1 | 5/2005 | Gold et al. |
| 2005/0135333 A1 | 6/2005 | Rojas |
| 2005/0144247 A1 | 6/2005 | Christensen et al. |
| 2005/0160345 A1 | 7/2005 | Walsh et al. |
| 2005/0202807 A1 | 9/2005 | Ayyasamy |
| 2005/0207487 A1 | 9/2005 | Monroe |
| 2005/0210394 A1 | 9/2005 | Crandall et al. |
| 2005/0215228 A1 | 9/2005 | Fostick et al. |
| 2005/0220137 A1 | 10/2005 | Prigent et al. |
| 2005/0237999 A1 | 10/2005 | Shores et al. |
| 2005/0259682 A1 | 11/2005 | Yosef et al. |
| 2005/0288101 A1 | 12/2005 | Lockton et al. |
| 2006/0007943 A1 | 1/2006 | Fellman |
| 2006/0023969 A1 | 2/2006 | Lara et al. |
| 2006/0041815 A1 | 2/2006 | Haymond |
| 2006/0045038 A1 | 3/2006 | Kay et al. |
| 2006/0046758 A1 | 3/2006 | Emami-Nouri et al. |
| 2006/0059199 A1 | 3/2006 | Lappalainen et al. |
| 2006/0059267 A1 | 3/2006 | Cugi et al. |
| 2006/0059342 A1 | 3/2006 | Medvinsky et al. |
| 2006/0062215 A1 | 3/2006 | Lam |
| 2006/0093304 A1 | 5/2006 | Battey et al. |
| 2006/0107285 A1 | 5/2006 | Medvinsky |
| 2006/0111130 A1 | 5/2006 | Lee et al. |
| 2006/0121925 A1 | 6/2006 | Jung |
| 2006/0146822 A1 | 7/2006 | Kolakowski et al. |
| 2006/0160522 A1 | 7/2006 | Jennings |
| 2006/0168003 A1 | 7/2006 | Vau et al. |
| 2006/0172754 A1 | 8/2006 | Shin et al. |
| 2006/0187897 A1 | 8/2006 | Dabbs et al. |
| 2006/0189305 A1 | 8/2006 | Ando et al. |
| 2006/0203802 A1 | 9/2006 | Chou et al. |
| 2006/0211411 A1 | 9/2006 | Haaramo et al. |
| 2006/0212582 A1 | 9/2006 | Gupta et al. |
| 2006/0212592 A1 | 9/2006 | Gupta et al. |
| 2006/0221995 A1 | 10/2006 | Berkman |
| 2006/0224748 A1 | 10/2006 | Gupta et al. |
| 2006/0229934 A1 | 10/2006 | Law |
| 2006/0232663 A1* | 10/2006 | Gandhi ................... H04L 51/38 348/14.02 |
| 2006/0244588 A1 | 11/2006 | Hannah et al. |
| 2006/0245367 A1 | 11/2006 | Jeffery et al. |
| 2006/0248149 A1 | 11/2006 | Kraft et al. |
| 2006/0251167 A1 | 11/2006 | Van Der Schaar et al. |
| 2006/0253599 A1 | 11/2006 | Monteiro et al. |
| 2006/0268750 A1 | 11/2006 | Weiner |
| 2006/0274698 A1 | 12/2006 | Twitchell |
| 2006/0274721 A1 | 12/2006 | Flanagan |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0002832 A1 | 1/2007 | Sylvain |
| 2007/0006021 A1 | 1/2007 | Nicholson et al. |
| 2007/0008884 A1 | 1/2007 | Tang |
| 2007/0067407 A1 | 3/2007 | Bettis et al. |
| 2007/0081622 A1 | 4/2007 | Bruder et al. |
| 2007/0110046 A1 | 5/2007 | Farrell et al. |
| 2007/0123267 A1 | 5/2007 | Whinnett et al. |
| 2007/0123284 A1 | 5/2007 | Schliwa-Bertling et al. |
| 2007/0147263 A1 | 6/2007 | Liao et al. |
| 2007/0150555 A1 | 6/2007 | He et al. |
| 2007/0155346 A1 | 7/2007 | Mijatovic et al. |
| 2007/0168863 A1 | 7/2007 | Blattner et al. |
| 2007/0177549 A1 | 8/2007 | Lo et al. |
| 2007/0180032 A1 | 8/2007 | Pearson |

(56) References Cited

U.S. PATENT DOCUMENTS

| | | |
|---|---|---|
| 2007/0182819 A1 | 8/2007 | Monroe |
| 2007/0184868 A1 | 8/2007 | Allen et al. |
| 2007/0189327 A1 | 8/2007 | Konda |
| 2007/0190987 A1 | 8/2007 | Vaananen |
| 2007/0192427 A1 | 8/2007 | Berstis et al. |
| 2007/0195742 A1 | 8/2007 | Erdman et al. |
| 2007/0207785 A1 | 9/2007 | Chatterjee et al. |
| 2007/0226804 A1 | 9/2007 | Somkiran et al. |
| 2007/0263575 A1 | 11/2007 | Choe |
| 2007/0268887 A1 | 11/2007 | Schwartz |
| 2007/0294333 A1 | 12/2007 | Yang et al. |
| 2007/0300007 A1 | 12/2007 | Bulusu et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0025300 A1 | 1/2008 | Lide et al. |
| 2008/0031250 A1 | 2/2008 | Mehta et al. |
| 2008/0031448 A1 | 2/2008 | Dang et al. |
| 2008/0062246 A1 | 3/2008 | Woodworth et al. |
| 2008/0086700 A1 | 4/2008 | Rodriguez et al. |
| 2008/0091839 A1 | 4/2008 | Mitchell et al. |
| 2008/0095173 A1 | 4/2008 | Bugenhagen |
| 2008/0095338 A1 | 4/2008 | Cosky |
| 2008/0109865 A1 | 5/2008 | Su et al. |
| 2008/0115087 A1 | 5/2008 | Rollin et al. |
| 2008/0117901 A1 | 5/2008 | Klammer |
| 2008/0119210 A1 | 5/2008 | Snyder et al. |
| 2008/0123623 A2 | 5/2008 | Kurganov et al. |
| 2008/0123628 A1 | 5/2008 | Everard |
| 2008/0134054 A1 | 6/2008 | Clark et al. |
| 2008/0147910 A1 | 6/2008 | Hibbard et al. |
| 2008/0155032 A1 | 6/2008 | Toeroe |
| 2008/0165707 A1 | 7/2008 | Baird et al. |
| 2008/0165791 A1 | 7/2008 | DeGrazia |
| 2008/0168173 A1 | 7/2008 | Munje et al. |
| 2008/0189295 A1 | 8/2008 | Khedouri et al. |
| 2008/0205444 A1 | 8/2008 | Campbell et al. |
| 2008/0231684 A1 | 9/2008 | Underwood et al. |
| 2008/0256255 A1 | 10/2008 | Mordovskoi et al. |
| 2008/0267377 A1 | 10/2008 | Siegrist |
| 2008/0273077 A1 | 11/2008 | Cowherd |
| 2009/0003340 A1 | 1/2009 | Katis et al. |
| 2009/0003536 A1 | 1/2009 | Katis et al. |
| 2009/0003544 A1 | 1/2009 | Katis et al. |
| 2009/0003545 A1 | 1/2009 | Katis et al. |
| 2009/0003547 A1 | 1/2009 | Katis et al. |
| 2009/0003560 A1 | 1/2009 | Katis et al. |
| 2009/0003563 A1 | 1/2009 | Katis et al. |
| 2009/0037541 A1 | 2/2009 | Wilson |
| 2009/0049140 A1 | 2/2009 | Stoddard et al. |
| 2009/0063698 A1 | 3/2009 | Xu et al. |
| 2009/0103689 A1 | 4/2009 | Katis et al. |
| 2009/0175425 A1 | 7/2009 | Lee |
| 2010/0005168 A1 | 1/2010 | Williams et al. |
| 2010/0030864 A1 | 2/2010 | Petry et al. |
| 2010/0046535 A1 | 2/2010 | Bugenhagen et al. |
| 2010/0198925 A1 | 8/2010 | Katis et al. |
| 2010/0199133 A1 | 8/2010 | Katis et al. |
| 2010/0215158 A1 | 8/2010 | Katis et al. |
| 2010/0217822 A1 | 8/2010 | Katis et al. |
| 2010/0255818 A1 | 10/2010 | Bozionek et al. |
| 2010/0279663 A1 | 11/2010 | Wang et al. |
| 2010/0312844 A1 | 12/2010 | Katis et al. |
| 2010/0312845 A1 | 12/2010 | Katis et al. |
| 2010/0312914 A1 | 12/2010 | Katis et al. |
| 2011/0010459 A1 | 1/2011 | Stokking et al. |
| 2011/0019662 A1 | 1/2011 | Katis et al. |
| 2011/0252161 A1 | 10/2011 | Ranney |
| 2012/0114108 A1 | 5/2012 | Katis et al. |
| 2012/0284352 A1 | 11/2012 | Katis et al. |
| 2016/0352666 A1 | 12/2016 | Katis et al. |
| 2016/0352792 A1 | 12/2016 | Katis et al. |
| 2016/0373389 A1 | 12/2016 | Katis et al. |
| 2016/0380929 A1 | 12/2016 | Katis et al. |

FOREIGN PATENT DOCUMENTS

| | | |
|---|---|---|
| EP | 1202531 | 5/2002 |
| GB | 2418566 A | 3/2006 |
| JP | 09-261155 | 10/1997 |
| JP | 2001-045560 | 2/2001 |
| JP | 2001-128133 | 5/2001 |
| JP | 2001-160858 | 6/2001 |
| JP | 2001-292090 | 10/2001 |
| JP | 2002-044360 | 2/2002 |
| JP | 2002-176510 | 6/2002 |
| JP | 2002-199019 | 7/2002 |
| JP | 2002-199088 | 7/2002 |
| JP | 2003-143237 | 5/2003 |
| JP | 2003-174681 | 6/2003 |
| JP | 2003-209611 | 7/2003 |
| JP | 2004-038575 | 2/2004 |
| JP | 2004-201096 | 7/2004 |
| JP | 2005-509337 | 7/2005 |
| JP | 2005-223650 | 8/2005 |
| JP | 2005-244522 | 9/2005 |
| JP | 2005-278109 | 10/2005 |
| JP | 2005-348192 | 12/2005 |
| JP | 2006-080919 | 3/2006 |
| JP | 2006-507765 | 3/2006 |
| JP | 2006-166284 | 6/2006 |
| JP | 2006-287422 | 10/2006 |
| JP | 2007-019767 | 1/2007 |
| JP | 2007-060016 | 3/2007 |
| JP | 2007-110395 | 4/2007 |
| JP | 2007-172264 | 7/2007 |
| WO | WO 01/93503 | 12/2001 |
| WO | WO 02/11398 | 2/2002 |
| WO | WO 03/015384 | 2/2003 |
| WO | WO 03/073642 | 9/2003 |
| WO | WO 2004/008336 | 1/2004 |
| WO | WO 2004/049608 | 6/2004 |
| WO | WO/2006/028850 | 3/2006 |
| WO | WO 2006/114673 | 11/2006 |
| WO | WO 2007/007847 | 1/2007 |
| WO | WO 2007/026320 | 3/2007 |
| WO | WO 2007/036032 | 4/2007 |

OTHER PUBLICATIONS

"Aspera—Next Generation File Transport—Broadcasting & Entertainment Media," Asperasoft.com, http://www.asperasoft.com/en/industries/digital_media_10/Broadcast_Entertainment_Media_5, Downloaded on Sep. 22, 2009, 2 pages.

"Aspera—Next Generation File Transport—fasp technology overview" Asperasoft.com, http://www.asperasoft.com/en/technology/fasp_overview_1/fasp_technology_overview_1, Downloaded on Sep. 22, 2009, 2 pages.

"Aspera—Next Generation File Transport—fasp™ transfer times," Asperasoft.com, http://www.asperasoft.com/en/technology/fasp_transfer_times_14/fasp_transfer_times_14, Downloaded on Sep. 22, 2009, 1 page.

"Aspera—Next Generation File Transport—the fasp solution," Asperasoft.com, http://www.asperasoft.com/en/technology/fasp_solution_3/the_fasp_solution_3, Downloaded on Sep. 22, 2009, 3 page.

"Aspera—Next Generation File Transport—the shortcomings of TCP file transfer," Asperasoft.com, http://www.asperasoft.com/en/technology/shortcomings_of_TCP_2/the_shortcomings_of_TCP_file_transfer_2, Downloaded on Sep. 22, 2009, 2 pages.

"Aspera fasp™ High Speed Transport—A Critical Technology Comparison," White Paper, Asperasoft.com, http://www.asperasoft.com/en/technology/white_papers_13/aspera_fasp_high_speed_transport_13, Downloaded on Sep. 22, 2009, 11 pages.

"Dircproxy," http://home.pcisys.net/~tbc/hacks/dircproxy.htm, Downloaded on Sep. 26, 2008, 1 page.

"Eudora," Answers.com, http://www.answers.com/topic/eudora-e-mail-client, Downloaded on Aug. 20, 2009, 4 pages.

"Palringo Brings First Push-to-Talk Application to the iPhone," RedOrbit.com, http://www.redorbit.com/news/technology/

(56) References Cited

OTHER PUBLICATIONS

1525545/palringo_brings_first_pushtotalk_application_to_the_iphone/index.html, Downloaded on Aug. 13, 2009, 2 pages.

"The Eudora Open Messaging Advantage," Qualcomm, 1997, Part No. 100-50030-1, 23 pages.

About.com, "*Linux / Unix Command: talk*,"http://linux.about.com/od/commands/1/b1cmd11_talk.htm, Downloaded on Sep. 26, 2008, 2 pages.

Amir et al., "*An Overlay Architecture for High Quality VoIP Streams*,", IEEE Transactions on Multimedia, Publication Date: Dec. 2006, vol. 8, Issue:6, on pp. 1250-1262.

Apple Inc., "*iPhone User's Guide*," http://manuals.info.apple.com/en_US/iPhone_User_Guide.pdf, Downloaded on Oct. 3, 2008, 154 pages.

Apple Inc., "*iPhone: About Visual Voicemail*," http://www.support.apple.com/kb/HT1486, Downloaded on Sep. 26, 2008, 3 pages.

Azuri, Calvin, "Palringo Gold Launched on BlackBerry Smartphone", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Baset et al., "*An Analysis of the Skype Peer-to-Peer Internet Telephony Protocol*," INFOCOM 2006. 25th IEEE International Conference on Computer Communications. Proceedings (2006), pp. 1-11.

Brandx.net, "*Using Talk*," http://www.brandx.net/support/usingtelnet/talk.shtml, Downloaded on Sep. 19, 2008, 2 pages.

Businesswire.com "*LignUp 4.0 Delivers Industry's Most Comprehensive Suite of Communications Web Services*," http://www.businesswire.com/portal/site/google/index.jsp?ndmViewId=news_view&newsId=20070430005498&newsLang=en, Downloaded on Nov. 21, 2008, 10 pages.

BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.

Calore, Michael, "*SpinVox Moves Into VoIP, Brings Voice-to-Text to Skype Users*," Monkey_Bites, http://blog.wired.com/monkeybites/2007/08/spinvox-moves-i.html, Downloaded on Oct. 3, 2008, 4 pages.

Cardei et al., "*MAC Layer QoS Support for Wireless Networks of Unmanned Air Vehicles*," Proceedings of the 37th Hawaii International Conference on System Sciences—2004, Jan. 5-8, 2004 p. 9 pages.

Cerf et al., "*A Protocol for Packet Network Intercommunication*," Communications, IEEE Transactions on, vol. 22, Issue 5, May 1974 pp. 637-648.

Charny, Ben, "*Nextel pushes new 'push to talk' features*," URL: http://news.zdnet.com/2100-9584_13 22-134945.html, Mar. 18, 2004, 3 pages.

Chen et al., "*An Adaptive Multimedia Transmission Protocol for Distributed Multimedia Applications*," Proceedings of the 5th International Workshop on Multimedia Network Systems and Applications (MNSA'2003), in conjunction with the 23rd International Conference on Distributed Computing Systems (ICDCS-2003), 6 pages.

Chuah et al., "*Store-and-Forward Performance in a DTN*," Vehicular Technology Conference, 2006. VTC 2006-Spring. IEEE 63$^{rd}$, Publication Date: May 7-10, 2006, vol. 1, on pp. 187-191.

CNETNews.com, "*Kadoink's phonecast lines officially open for texting*," http://news.cnet.com/8301-17939_109-9829877-2.html, downloaded on Sep. 26, 2008, 1 page.

Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pages.

Erwu et al., "*Packet-late indication based (PLIB): adaptive jitter buffer*," ACM International Conference Proceeding Series; vol. 58, Proceedings of the winter international symposium on Information and communication technologies, Cancun, Mexico, Session: Performance, reliability, and quality of service, pp. 1-5 Year of Publication: 2004.

Fall, Kevin, "*A Delay-Tolerant Network Architecture for Challenged Internets*," Feb. 2003, http://www.dtnrg.org/docs/papers/IRB-TR-03-003.pdf, 15 pages.

FAQS.org, "*RFC1644-T/TCP—TCP Extensions for Transactions Functional S*," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "*Call Record*," http://www.grandcentral.com/howitworks/call_record, Downloaded on Sep. 26, 2008, 1 page.

GrandCentral.com, "*One Voicemail Box*," http://www.grandcentral.com/home/one_voicemail, Downloaded on Sep. 26, 2008, 1 page.

GrandCentral.com, "*So Many Features, You Won't Believe It*," http://www.grandcentral.com/support/howitworks/, Downloaded on Sep. 26, 2008, 1 page.

GrandCentral.com, "*Voicemail Forwarding*," http://www.grandcentral.com/howitworks/voicemail_forwarding, Downloaded on Sep. 26, 2008, 1 page.

Henshall, Stuart, "*HotRecorder—Record Skype Calls*," Skype Journal, URL: http://skypejournal.com/blog/archives/2005/03/hotrecorder_rec.php, Mar. 25, 2005, 11 pages.

HotRecorder.com, "*FAQs*," http://www.hotrecorder.com/music_support.asp, downloaded on Sep. 26, 2008, 1 page.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

IRCHelp.org, "*An IRC Tutorial*," http://www.irchelp.org/irchelp/irctutorial.html, Downloaded on Sep. 26, 2008, 14 pages.

Jabber.org, "*FAQ*," http://www.jabber.org/web/faq, Sep. 4, 2008, downloaded on Sep. 26, 2008, 2 pages.

Jabber.org, "*Main Page*," http://www.jabber.org/web/main_page, Sep. 2, 2008, downloaded on Sep. 26, 2008, 1 page.

Jabber.org, "*Products // Jabber Clients*," http://www.jabber.com/CE/JabberClients, downloaded on Sep. 26, 2008, 1 page.

Jabber.org, "*Products // Jabber XCP // Benefits*," http://www.jabber.com/CE/JabberXCPBenefits, downloaded on Sep. 26, 2008, 1 page.

Jabber.org, "*Products // JabberNow*" http://www.jabber.com/CE/JabberNow, downloaded on Sep. 26, 2008, 1 page.

JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.

Kadoink.com, "*Get a Widget*," http://www.kadoink.com/index.cfm?action=getWidgets, Downloaded on Sep. 19, 2008, 3 pages.

KillerStartups.com, "*Kadoink.com—Mobilizing your Socializing*," http://www.killerstartups.com/Web20/kadoink-com-moblizing-your-socializing, Downloaded on Sep. 26, 2008, 3 pages.

Krishnan et al., "*EVRC-Wideband: The New 3GPP2 Wideband Vocoder Standard*," IEEE International Conference on Acoustics, Speech and Signal Processing, 2007. ICASSP 2007, Publication Date: Apr. 15-20, 2007, vol. 2, on pp. II-333-II-336, Honolulu, HI.

Krishnan, et al., "*The SPINDLE Disruption-Tolerant Networking System*," Military Communications Conference, 2007. MILCOM 2007. IEEE vol., Issue , Oct. 29-31, 2007 pp. 1-7.

Layton, Julia, "*How Slingbox Works*," Jan. 4. 2006, HowStuffWorks.com, http://electronics.howstuffworks.com/slingbox.htm, 9 pages.

Liaw, Kim Poh, "Palringo launches its IM Software for Android Phones," Slashphone.com, Mar. 24, 2009, http://www.slashphone.com/palringo-launches-its-im-software-for-android-phones-245111, Downloaded on Aug. 13, 2009, 8 pages.

LignUp.com, "*LignUp Communications Applications Server*," http://www.lignup.com/platform/index.html, Downloaded on Sep. 19, 2008, 1 page.

Moren, Dan, "Palringo Brings Picture Messaging to Iphone," http://www.pcworld.com/article/149108/palringo_brings_picture_messaging_to_iphone.html, Downloaded on Aug. 13, 2009, 3 pages.

(56) References Cited

OTHER PUBLICATIONS

Network Dictionary, "*Instant Message (IM) Technology Overview*," http://www.networkdictionary.com/networking/im.php, Downloaded on Sep. 16, 2008, 2 pages.
Nikotalkie.com, "*Nikotalkie—Home*," http://www.nikotalkie.com/, Downloaded on Sep. 19, 2008, 2 pages.
Nikotel.com, "*Click-Pop-Talk WebStart Phone*," http://www.nikotel.com/nikotel-click-pop-talk-java-phone.html, Downloaded on Sep. 19, 2008, 1 page.
Notaras, George, "*Dircproxy IRC Proxy*," http://www.g-loaded.eu/2007/02/01/dircproxy-irc-proxy/, Downloaded on Sep. 26, 2008, 4 pages.
Palringo—Features, Palringo.com, http://www.palringo.com/en/gb/features/, Downloaded on Aug. 13, 2009, 1 page.
Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.
Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.
Paul, Ryan, "Gmail gets Google Talk integration,"Arstechnica.com, http://arstechnica.com/old/content/2006/02/6128.ars , Downloaded on Aug. 20, 2009, 1 page.
Piecuch et al., "*A Selective Retransmission Protocol for Multimedia on the Internet*," In Proceedings of SPIE Multimedia Systems and Applications, Nov. 2000, Boston MA, USA, 12 pages.
Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.
Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603-606.
Rey et al., "*I-D Action:draft-ietf-avt-rtp-retransmission-09.txt*," Aug. 5, 2003, http://osdir.com/ml/ietf.avt/2003-08/msg00003.html, Downloaded on Sep. 19, 2008, 2 pages.
Ribbit.com, "*Amphibian*," http://www.ribbit.com/everyday/, Downloaded on Sep. 26, 2008, 1 page.
Ribbit.com, "*Enhanced Visual Voicemail*," http://www.ribbit.com/everyday/tour/enhanced_visual_voicemail.php, Downloaded on Sep. 26, 2008, 2 pages.
Ribbit.com, "*What is Ribbit? Features*," http://www.ribbit.com/platform/features.php, Downloaded on Sep. 26, 2008, 1 page.
Ribbit.com, "*What is Ribbit? Overview*," http://www.ribbit.com/platform/index.php, Downloaded on Sep. 26, 2008, 1 page.
Ribbit.com, "*What is Ribbit? Voice Architecture*," http://www.ribbit.com/platform/architecture.php, Downloaded on Sep. 26, 2008, 2 pages.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.
Sherman, Chris, "Google Integrates Chat with Gmail," Search Engine Watch, http://searchenginewatch.com/3583121, Feb. 7, 2006, Downloaded on Aug. 20, 2009, 2 pages.
Skype.com, "*Making calls is just the start*," URL: http://www.skype.com/features/, Downloaded on Sep. 16, 2008, 2 pages.
Spinvox.com, "*Home Page*," http://www.spinvox.com/, Downloaded on Sep. 26, 2008, 3 pages.
Spinvox.com, "*How Does it Work?*," http://www.spinvox.com/how_it_works.html, Downloaded on Sep. 19, 2008, 2 pages.
Swissvoice.net, "*PSTN*," http://www.swissvoice.net/ww/htm_ww/08_technology/content_pstn.html, Downloaded on Sep. 19, 2008, 3 pages.
Tektronix, "*VOIP Technology Overview; Protocols, Convergence, Testing*," http://www.tektronics.com/voip, May 12, 2006.
The Jabber Extensible Communications Platform™, "*Products // Jabber XCP*," URL: http://www.jabber.com/CE/JabberXCP, Downloaded on Sep. 16, 2008, 2 pages.
ThunkDifferent.com, "*YouMail vs. Google Grandcentral Voice Mail Service*," http://thunkdifferent.com/2007/10/11/youmail-vs-google-grandcentral-voice-mail-service/, Downloaded on Oct. 3, 2008, 6 pages.
VOIP-News.com, "*Company Profile—LignUp*," http://www.voip-news.com/vendors/lignup/, Downloaded on Oct. 3, 2008, 6 pages.
VOIP-News.com, "*Company Profile, LignUp*," http://www.voip-news.com/vendors/lignup/, Downloaded on Dec. 5, 2008, 6 pages.
WikiBooks, "*Internet Technologies/IRC*," http://en.wikibooks.org/wiki/Internet_Technologies/IRC, Downloaded on Sep. 19, 2008, 4 pages.
WikiPedia—The Free Encyclopedia, "*E-mail*," http://en.wikipedia.org/wiki/E-mail, Downloaded on Sep. 19, 2008, 8 pages.
WikiPedia—The Free Encyclopedia, "Eudora (email client)," http://en.wikipedia.org/wiki/Eudora_(e-mail_client), Downloaded on Aug. 20, 2009, 3 pages.
WikiPedia—The Free Encyclopedia, "Google Talk," http://en.wikipedia.org/wiki/Google_Talk, Downloaded on Aug. 20, 2009, 8 pages.
WikiPedia—The Free Encyclopedia, "*Internet Relay Chat*," http://en.wikipedia.org/wiki/Internet_Relay_Chat, Downloaded on Oct. 3, 2008, 11 pages.
WikiPedia—The Free Encyclopedia, "Palringo" http://en.wikipedia.org/wiki/Palringo, Downloaded on Aug. 13, 2009, 1 page.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "*Skype Protocol*," http://en.wikipedia.org/wiki/Skype, Downloaded on Sep. 26, 2008, 4 pages.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Slingbox*" http://en.wikipedia.org/wiki/Slingbox, Downloaded on Sep. 26, 2008, 4 pages.
WikiPedia—The Free Encyclopedia, "*Spinvox*," http://en.wikipedia.org/wiki/Spinvox, Downloaded on Sep. 26, 2008, 1 page.
WikiPedia—The Free Encyclopedia, "*TiVo*", http://en.wikipedia.org/wiki/TiVo, Downloaded on Sep. 16, 2008, 6 pages.
WikiPedia—The Free Encyclopedia, "*Visual Voicemail*" http://en.wikipedia.org/wiki/Visual_voicemail, downloaded on Sep. 26, 2008, 1 page.
Yavuz et al., "*VoIP over cdma2000 1xEV-DO Revision A*," IEEE Communications Magazine, Feb. 2006, pp. 88-95.
International Search Report in PCT/US2009/057893, mailed Apr. 21, 2010.
Written Opinion in PCT/US2009/057893, mailed Apr. 21, 2010.
International Preliminary Report on Patentability in PCT/US2009/057893, mailed Apr. 19, 2011.
Rosenberg, J. et al., "SIP: Session Initiation Protocol," The Internet Society, Jun. 2002, 270 pages.
Office Action in U.S. Appl. No. 12/419,914, mailed Jan. 30, 2012.
Wikipedia encyclopedia definition "User Datagram Protocol" http://en.wikipedia.org/wiki/User_Datagram_Protocol, last modified Mar. 9, 2012.
European Search Report mailed Jan. 6, 2012 in EP application 11174497.
Allen et al., "The P-Answer-State Header Extension to the Session Initiation Protocol for the Open Mobile Alliance Push to Talk over Cellular," URL: http://tools.ietf.org/html/rfc4964, Sep. 2007, 32 pages.
Japanese Office Action dated Nov. 5, 2013 from Japanese Application No. 2011-547919.
Australian Office Action dated Nov. 12, 2013 from Australian Application No. 2009338743.

(56) References Cited

OTHER PUBLICATIONS

Katis et al., U.S. Appl. No. 15/231,240, filed Aug. 8, 2016.
Katis et al., U.S. Appl. No. 15/238,962, filed Aug. 17, 2016.
Katis et al., U.S. Appl. No. 15/256,887, filed Sep. 6, 2016.
Katis et al., U.S Appl. No. 15/233,325, filed Aug. 10, 2016.
Katis et al., U.S Appl. No. 15/257,057, filed Sep. 6, 2016.
"Protocol for Multimedia Application Text Conversion," International Telecommunication Union, Published Feb. 1998, 17 pages.
"Store and Forward," Wikipedia, the free encyclopedia, URL: http://en.wikipedia.org/wiki/Store_and_forward, Downloaded on Oct. 26, 2011, 2 pages.
$2^{nd}$ Patent Examination Report from AU 2008270895, dated Nov. 1, 2012.
Anonymous: "VoiceEmotion", Jun. 3, 2006 (Jun. 3, 2006). XP55058210, Retrieved from the Internet: URL:http:jjweb.archive.orgjweb/20060603021611/http://www.voiceemotion.comjtutorial.htm [retrieved on Apr. 2, 2013].
Anonymous: "VoiceEmotion", May 5, 2006 (May 5, 2006). XP55058207. Retrieved from the Internet: URL:http:jjweb.archive.orgjweb/20060505064512/http://www.voiceemotion.com/index.htm [retrieved on Apr. 2, 2013].
Chinese Office Action from 200880021723.2, mailed May 4, 2012 with English translation.
Examination Report from Australian Application No. 2008270956, dated Feb. 7, 2012.
Examination Report from Australian application No. 2008270956, dated Jan. 12, 2011.
Extended EP Search Report in EP Application No. 11170723.8, dated Apr. 22, 2013.
Extended EP Search Report in EP Application No. 11179399.8, dated Apr. 11, 2013.
International Search Report from PCT/US2008/062049, mailed Jan. 12, 2009.
International Search Report from PCT/US2008/062941, mailed Oct. 24, 2008.
International Search Report from PCT/US2008/063117 dated Oct. 24, 2008.
Korean Office Action in KR 10-2013-7011111 dated Nov. 15, 2013, with English translation.
Office Action from EP Application No. 11179399.8 dated Feb. 3, 2014.
Office Action in Chinese Application No. 200880016045.0, mailed Jun. 25, 2012, with English translation.
Office Action in Chinese Application No. 200880021553.8, mailed May 17, 2012, with English translation.
Office Action in Chinese Application No. 200880021664.9, mailed May 3, 2012, with English translation.
Office Action in Chinese Application No. 200880021725.1, mailed May 17, 2012, with English translation.
Office Action in Chinese Patent Application No. 200880016045.0 dated Feb. 25, 2013, with English Translation.
Office Action in Chinese Patent Application No. 200880021664.9 dated Jan. 14, 2013, with English Translation.
Office Action in EP 08747806.1, dated Apr. 27, 2010.
Office Action in EP 08769254.7, dated Jul. 12, 2010.
Office Action in EP Application No. 111637880 dated Feb. 24, 2015.
Office Action in EP Application No. 11179399.8 dated Feb. 27, 2015.
Office Action in Japanese Patent Application No. 2010-514894 dated Oct. 30, 2012, with English Translation.
Office Action in Japanese Patent Application No. 2010-514896 dated Dec. 7, 2012, with English Translation.
Office Action in Japanese Patent Application No. 2010-514896, mailed Aug. 7, 2012, with English translation.
Office Action in Japanese Patent Application No. 2010-514916 dated Dec. 18, 2012, with English Translation.
Office Action in Japanese Patent Application No. 2013-073423 dated Feb. 10, 2014.
Office Action in Japanese Patent Application No. JP 2013-073422 dated Mar. 10, 2014.
Office Action in Japanese Patent Application No. JP 2013-081798 dated Apr. 8, 2014.
Office Action in Korean Patent Application No. 10-2013-7011111 dated May 12, 2014.
Office Action in Korean Patent Application No. 10-20107001868 dated Jan. 6, 2014.
Office Action in Korean Patent Application No. 10-20107001879 dated Jan. 6, 2014.
Office Action in Korean. Patent Application No. 10-20107020536 dated Jan. 6, 2014.
Patent Examination Report from AU 2008270895, dated Sep. 11, 2012.
Peter, I., et al., "The Wavelet Stream: Progressive transmission of compressed light field data" In IEEE Visualization 1999 (pp. 69-72).
Trial Decision in JP Application No. 2010-514896, mailed Feb. 4, 2014 with English Summary.
Written Opinion from PCT/US2008/062049, mailed Jan. 12, 2009.
Written Opinion from PCT/US2008/062941, mailed Oct. 24, 2008.
Written Opinion from PCT/US2008/063117. dated Oct. 24, 2008.
Wurmlin, S., et al. "3D Video Recorder: A System for Recording and Playing Free-Viewpoint Video" Computer Graphics forum vol. 22(2003), No. 2 pp. 181-193.
Japanese Office Action dated Nov. 10, 2015 from Japanese Application No. 2014-261237.
Japanese Office Action dated Jul. 26, 2016 from Japanese Application No. 2014-261237.
Wikipedia, "Connectionless Communication", https://en.wikipedia.org/wiki/Connectionless_communication, May 26, 2016.
Decision of Rejection dated Jul. 10, 2013, from Chinese Application No. 200880016045.0.
Notification of Reexamination dated Nov. 2, 2015, from Chinese Application No. 200880016045.0.
Decision on Reexamination dated Mar. 31, 2016, from Chinese Application No. 200880016045.0.
Chinese Office Action dated Jun. 21, 2016, from Chinese Application No. 200880016045.0.
Chinese Office Action dated Feb. 17, 2013, from Chinese Application No. 200880021553.8.
Chinese Office Action dated Sep. 11, 2013, from Chinese Application No. 200880021553.8.
Chinese Office Action dated Apr. 28, 2014, with English translation from Chinese Application No. 200880021553.8.
Chinese Office Action dated Sep. 18, 2013, from Chinese Application No. 200980155405.X.
Chinese Office Action dated Apr. 9, 2014, from Chinese Application No. 200980155405.X.
Chinese Office Action dated Feb. 17, 2013, from Chinese Application No. 200880021725.1.
Chinese Office Action dated Sep. 12, 2013, from Chinese Application No. 200880021725.1.
Chinese Office Action dated Apr. 3, 2014, from Chinese Application No. 200880021725.1.
Chinese Office Action dated Jul. 16, 2013, from Chinese Application No. 200880021664.9.
Japanese Office Action (Hearing) dated Jun. 25, 2013 from Japanese Application No. 2010-514896.
Japanese Office Action dated Aug. 5, 2014 from Japanese Application No. 2013-073423.
Japanese Office Action (Decision of Rejection) dated Aug. 26, 2014 from Japanese Application No. 2013-081798.
Australian Patent Examination Report dated Feb. 12, 2013 from Australian Application No. 2008270895.
Australian Patent Examination Report dated Apr. 7, 2014 from Australian Application No. 2013201918.
Australian Patent Examination Report dated May 27, 2014 from Australian Application No. 2013201918.
Australian Patent Examination Report dated Apr. 21, 2015 from Australian Application No. 2013201918.
Australian Patent Examination Report dated Apr. 30, 2014 from Australian Application No. 2013202611.
Australian Patent Examination Report dated Oct. 19, 2012 from Australian Application No. 2008270959.

(56) References Cited

OTHER PUBLICATIONS

Australian Patent Examination Report dated Aug. 24, 2012 from Australian Application No. 2008270959.
Australian Patent Examination Report dated Aug. 30, 2012 from Australian Application No. 2008270967.
European Office Action dated Sep. 8, 2009 from European Application No. 08747114.0.
European Office Action dated Aug. 26, 2010 from European Application No. 08747114.0.
European Search Report dated Apr. 11, 2013 from European Application No. 11163788.0.
European Office Action dated Dec. 4, 2013 from European Application No. 11163788.0.
European Office Action dated Sep. 28, 2015 from European Application No. 11163788.0.
European Office Action dated Feb. 9, 2016 from European Application No. 11163788.0.
European Office Action dated May 4, 2016 from European Application No. 11163788.0.
European Office Action dated Sep. 25, 2015 from European Application No. 11179399.8.
European Office Action dated May 28, 2010 from European Application No. 08756317.7.
European Office Action dated Nov. 11, 2010 from European Application No. 08756317.7.
European Office Action dated Nov. 18, 2010 from European Application No. 08747806.1.
European Office Action dated Apr. 13, 2012 from European Application No. 09804087.6.
Canadian Office Action dated Mar. 12, 2014 from Canadian Application No. 2,837,950.
Canadian Office Action dated Nov. 18, 2013 from Canadian Application No. 2,682,184.
Canadian Office Action dated Jan. 26, 2015 from Canadian Application No. 2,692,976.
Canadian Office Action dated Aug. 19, 2015 from Canadian Application No. 2,691,814.
Canadian Office Action dated Jan. 26, 2015 from Canadian Application No. 2,692,928.
Canadian Office Action dated Nov. 13, 2014 from Canadian Application No. 2,746,734.
Canadian Office Action dated Jan. 23, 2015 from Canadian Application No. 2,691,814.
Korean Office Action dated Sep. 5, 2013 from Korean Application No. 10-2009-7020536.
Korean Office Action dated Sep. 5, 2013 from Korean Application No. 10-2010-7001879.
Korean Office Action dated Aug. 8, 2014 from Korean Application No. 10-2013-7011111.
Korean Office Action dated Feb. 9, 2015 from Korean Application No. 10-2011-7019515.
Korean Office Action dated Jun. 21, 2013 from Korean Application No. 10-2009-7026979.
Korean Office Action dated Oct. 18, 2013 from Korean Application No. 10-2009-7026979.
Korean Office Action dated Mar. 13, 2014 from Korean Application No. 10-2013-7011235.
Korean Office Action dated Sep. 19, 2014 from Korean Application No.10-2013-7011235.
Korean Office Action dated Sep. 5, 2013 from Korean Application No. 10-2010-7001868.
J. Bellamy: "Digital Telephony, $2^{nd}$ Edition", In: "Digital Telephony, $2^{nd}$ Edition", Jan. 1, 1991, John Wiley & Sons, New York, US, XP055264025, pp. 547 and 561.
ITU-T Recommendation, T.140, "Series T: Terminals for Telematic Services Protocol for Multimedia Application Text Conversation", Feb. 1998.
Shinsuke Suzuki, "Searching for the Path to a Destination IP Address—Connection Between Routing Control and Neighborhood Searches", Nikkei Network, Nikkei Business Publications, Inc. Oct. 22, 2000, vol. 7, pp. 165-169.

\* cited by examiner

Figures 8, 9:
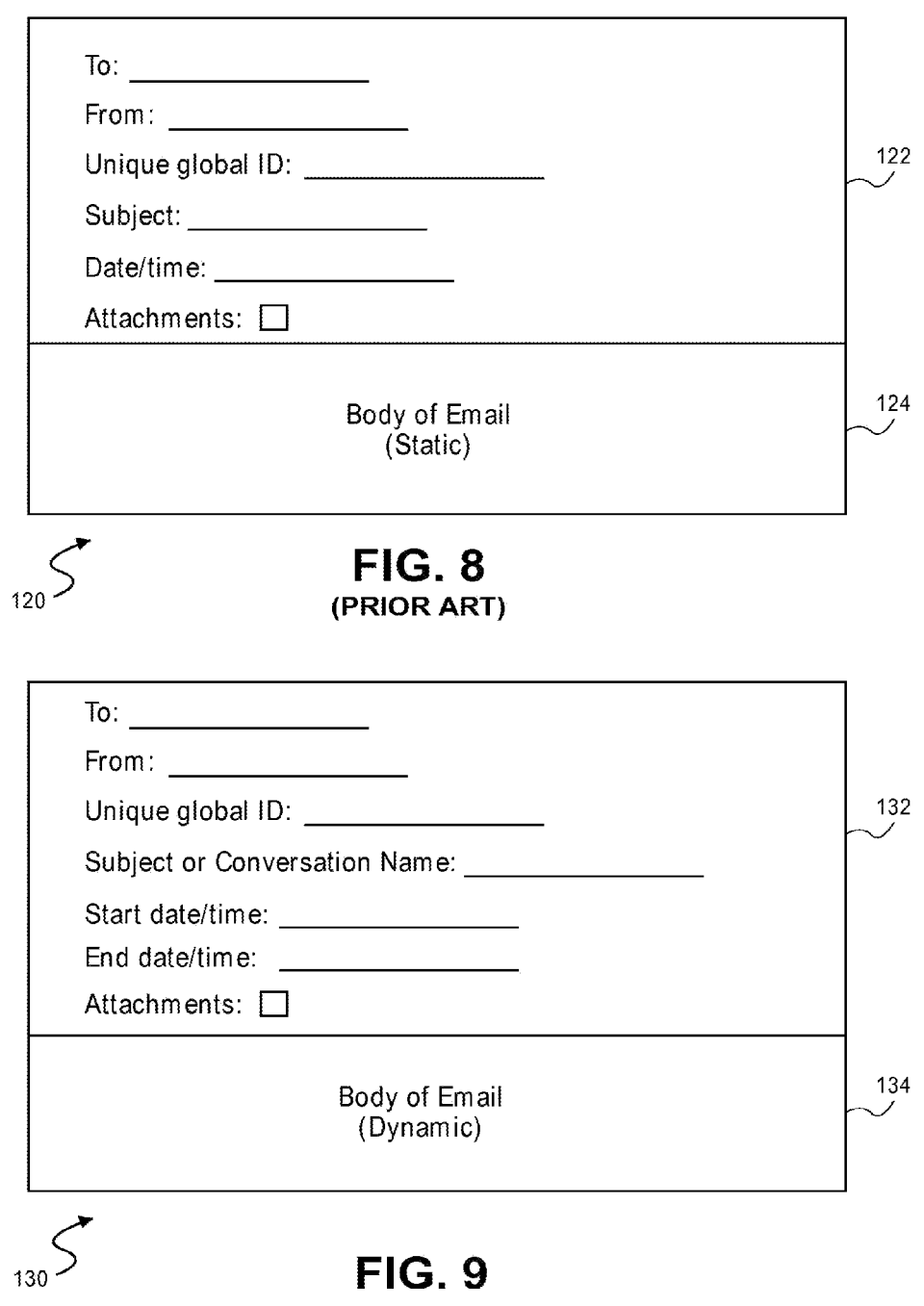

```
                    To: _____
                    From: _____
                    Unique global ID: _____       ⎫
                                                        ⎬ 122
                    Subject: _____                ⎭
                    Date/time: _____
                    Attachments: ☐
                    ─────────────────────────────
                                                        ⎫
                              Body of Email             ⎬ 124
                                (Static)                ⎭
```

```
                    To: _____
                    From: _____
                    Unique global ID: _____       ⎫
                                                        ⎬ 132
                    Subject or Conversation Name: ____  ⎭
                    Start date/time: _____
                    End date/time: _____
                    Attachments: ☐
                    ─────────────────────────────
                                                        ⎫
                              Body of Email             ⎬ 134
                               (Dynamic)                ⎭
```

REAL-TIME MESSAGING METHOD AND APPARATUS

CROSS-REFERENCE TO RELATED APPLICATIONS

This application is a Continuation of U.S. application Ser. No. 14/839,266 (P020FC1), filed Aug. 28, 2015, which is a Continuation of U.S. application Ser. No. 12/857,486 (P020F), filed Aug. 16, 2010, now U.S. Pat. No. 9,178,916. U.S. application Ser. No. 12/857,486 (P020F) is a Continuation-in-Part of U.S. application Ser. Nos. 12/419,861 (P020A), Ser. No. 12/419,889 (P020B), 12/419,914 (P020C), 12/552,979 (P020D), and 12/552,980 (P020E), each claiming priority of U.S. application Ser. No. 61/148,885 (P020P) filed Jan. 30, 2009. U.S. application Ser. No. 12/857,486 (P020F) is also a continuation-in-part of U.S. application Ser. No. 12/028,400 (P001), filed on Feb. 8, 2008, now U.S. Pat. No. 8,180,029, which claims priority of U.S. patent application Nos. 60/937,552 (P001P) filed on Jun. 28, 2007 and 60/999,619 (P001P2), filed on Oct. 19, 2007. All of the above-listed applications are incorporated herein by reference for all purposes.

BACKGROUND

Field of the Invention

This invention pertains to communications, and more particularly, to a late binding communication system and method for real-time communication of time-based media.

Description of Related Art

Currently there are three globally used addressing domains. The postal system, which is mainly used for the delivery of letters and parcels, relies on the use of a physical address, such as a house address, office building address or Post Office (PO) box. In order to assure the delivery of a letter or parcel, the physical address of the recipient must be provided, including a country, state or territory, a city or town, postal or zip code, street name and street number. The existing telephone infrastructure defines another global addressing domain that has historically been used for near real-time voice communications (i.e., telephone calls). Both land-line and mobile telephones are addressed (i.e., called) using a telephone number, which typically includes a country code and a variable number of additional digits to identify a particular phone within a given country and/or area code. When a circuit connection is made between the calling parties, a full duplex conversation may take place. A third global addressing system is email. Every email account is identified by a unique globally addressable email address, which defines a user name and a domain name.

Emails are typically text messages that are sent from a sender to one or more recipients. The emails are created on an email client. One well-known email client is Microsoft Outlook, which is used to create, receive and manage email messages on a computer. Alternatively, free email services like Yahoo, Google or Hotmail are available to users through a web page. Regardless of the type used, an email client will typically (i) list or display all the received messages, with an email header showing the subject of the email, the sender of the email, the date/time it was sent and possibly other attributes such as the size of the email; (ii) allow the user to select messages for review; (iii) allow the user to type and send new messages to recipients and reply to the received emails of others; and (iv) allow attachments, such as still photos, documents, or video clips, to be attached to an out-going email.

An email message must first be created in full before it can be sent. A sender will typically first define a recipient by entering their email address into the appropriate "To" field in the header of the email. The text message is then typed into the body of the email and files may optionally be attached. When the message is complete, the user sends the email. During the send sequence, the email client initiates a session with its email server located on a network. This session is typically established with the Simple Mail Transport Protocol (SMTP). During the session, the email client provides the SMTP server with the email address of the sender, the email address of the recipient, and the body of the email with any attachments. The email addresses of the recipient is segmented into two parts, including the recipient's name (e.g., "jsmith") and the domain name (e.g., "hotmail.com"). If the recipient is in a domain that the SMTP server controls, then the server carries out delivery instructions for the specific recipient, which is typically delivery of the email to an in-box associated with the recipient on the same SMTP server or another server located in the same domain. On the other hand if the recipient is in a domain that the server does not control, then the email server needs to communicate with a server that controls the recipient's domain using SMTP.

To send the email to the recipient in another domain, the SMTP server initiates a conversation with the Domain Name System (DNS), asking for the Mail eXchanger (MX) record of the recipient's domain. This MX record contains a prioritized list of SMTP servers for that domain. The email is then sent from the SMTP server of the sender to the first SMTP server in the MX list that responds. This first responding server then determines if the recipient is in the domain the first responding server controls. If so, the email is delivered to the inbox of the recipient. If not, the above-described process is repeated until a responding server is the one that can deliver the message into the recipient's inbox. Each server along the delivery route is sometimes referred to as a "hop". Once in the inbox, the email may be accessed through the email client of the recipient, which may be located on the computer of the recipient or on the Internet. If an email is sent to multiple parties, the above-described process is repeated for each recipient.

The above-described sequence generally applies for emails sent over the Internet. With certain proprietary systems, such as an email sent between two Microsoft Exchange users on the same proprietary network, the SMTP protocol may not be used for routing the email but email addresses are still used. The operation of the proprietary protocol and server is essentially the same as SMTP.

The existing email infrastructure, regardless if it relies on SMTP or a proprietary email protocol, is essentially a "store and forward" messaging system. An email message must first be created in its entirety before it can be sent. At the SMTP or proprietary mail server of the sender, as well as any intermediate email server hops along the path to the SMTP or proprietary mail server of the recipient, the email message must be received in full before it can be forwarded. Finally the email must be received in full at the inbox of the recipient before the recipient can review the message.

By way of comparison, telephone conversations over the Public Switched Telephone Network (PSTN) are progressive in nature. As words are spoken, they are simultaneously transmitted from the sender to the recipient, where they are heard effectively live or near real-time. As a result, telephone conversations can be conducted in a "live" or near real-time mode through a common network connection (i.e., a circuit). Email communication in contrast usually occurs through a series of separate store and forward messages, often sent back and forth between two or more parties at distinct times, across a network, such as the Internet.

It is well known to attach a file to an email containing time-based media (i.e., media that changes with respect to time), such as a video clip. The time-based media attached to an email message, however, can never be reviewed by a recipient "live", as it is being created, due to the store and forward nature of email. Rather the email and the attachment containing the time-based media must first be created, sent, stored and forwarded at each email server hop on the network, and then received by the recipient in full before the time-based media of the attachment can be reviewed. It is therefore not possible for the recipient of an email message to review the media in near real-time as the media is being created.

Telephone messaging systems are also known where a voice message may be created and sent to a recipient in the form of an email. With these systems, the Public Switched Telephone Network (PSTN) is used in cooperation with emails. In use, a recording of the message must first be made, stored, and then forwarded to the recipient by email. Again, however, the message must first be received in full before the recipient can review the recorded message.

Instant messaging or IM is another example of a store and forward system. Similar to email as described above, messages must be completed before they can be forwarded to a recipient. Messages in IM systems are generally much shorter than those sent via email. Each line of text in IM systems is a separate message delivered in a store and forward manner. Existing IM systems do not provide a way for a recipient to progressively and simultaneously review a message as the sender creates the message.

"Live" text systems are well known, although they were mostly used on early Unix systems with dumb terminal interfaces. These text systems, give the appearance of being "live" since each individual keystroke is sent to the recipient as soon as the sender pressed that key. But in reality, these systems are actually store and forward based, where the transmission of each keystroke is a discrete event. These systems are for text only (i.e., non time-based media only) and they do not allow the recipient to progressively review the media in real-time per se.

In the context of communications, a recipient address can be described as "bound" when a valid delivery path across the network has been determined for that address. Conventional telephone calls over the PSTN are said to use "early binding" because the dialed phone number, the "recipient address" in this case, is used to establish some active path (i.e., a circuit connection) to the recipient before any media can be transmitted to the recipient. Only after the connection is made can the caller begin speaking and the media transmitted. Regardless if the call is placed to one or more telephone numbers, or the call is transferred to a voice messaging system, the binding typically occurs before any words can be delivered. Since the binding of the recipient's address to an active destination on the network happens before any transmission of media, it is said to be "early". In contrast, emails are said to employ "late" binding. A person may compose an email message and send it over a network without binding that message to the device on which the recipient will consume it. Instead, after the email is composed, the email address of the recipient is used to route the email to the recipient to be reviewed on a device and at a time of the recipient's choosing. Since late binding systems require the completion of a message before it can be sent, late binding systems cannot be used for "live" communication.

SUMMARY OF THE INVENTION

The present invention solves many of the problems of the prior art by providing a late binding communication system and method for real-time communication of time-based media. With late binding, a sender has the ability to transmit time-based media before or at the same time as an active delivery route over a communication network to the recipient is discovered. As soon as the delivery route becomes at least partially known (i.e., the next hop), the sender may transmit available time-based media. By providing both the sender and each server hop with the ability to transmit available media as soon the next hop is discovered, time-based media may be transmitted to the recipient in real-time before the complete delivery route to the recipient is fully known. Late binding thus solves the above-described problems, namely the (i) waiting for a circuit connection to be established before communication may take place, with either the recipient or a voice mail system associated with the recipient, as required with conventional telephony or (ii) waiting for an email to be composed in its entirety before the email may be sent.

In one non-exclusive embodiment, the invention uses the existing global addressing and routing infrastructure of email to support real-time communication of time-based media. With this embodiment, the sender defines the email address of the intended recipient. As soon as the email address is defined, a delivery route to the recipient is discovered using the existing DNS infrastructure and DNS lookup results of the email address. A real-time communication protocol is used for the actual delivery of the time-based media to the recipient as the delivery route is discovered.

In another non-exclusive embodiment, an email client that is capable of sending "progressive" emails is used. Like conventional emails, progressive emails include a header that has one or more fields for defining the email address for one or more recipients. Progressive emails, however, differ from conventional emails in at least two regards. With progressive emails, a delivery route to the recipient is discovered as soon as the email address of the recipient is defined, rather than after the body of the email is composed and the email is sent. The body of progressive emails is dynamic, not static, as with conventional emails. Consequently as time-based media associated with the email is created, it is progressively transmitted to the recipient using the route discovered as soon as the email address of the recipient is defined. By further modifying the access protocols used in cooperation with convention email protocols, the recipient may also review the incoming time-based media of progressive emails in real-time as the media is received. In variations of this embodiment, the email client may reside on a server or on a communication device of the sender and the progressive email may be delivered to an inbox associated with the recipient located either at a server associated with the recipient and/or on the communication device of the recipient.

The invention may also be used in cooperation with a messaging system where the time-based media of transmitted and received messages is progressively stored as either as the media is created or received respectively. With the progressive storage of time-based media, a recipient may review incoming messages either (i) synchronously in a real-time mode, (ii) asynchronously in a time-shifted mode and (iii) seamlessly transition the review of a message between the two modes. In addition, the messaging between two or more parties may be either half or full duplex, the latter providing a user experience similar to a conventional telephone call. Another advantage associated with the storage of created media is the ability to provide limited communication capabilities when the communication device of a user is disconnected from the network. A user of a cell or mobile phone for example will often roam into regions beyond network coverage, or into areas where network coverage is weak or non-existent. When this occurs, the user can still create a message for a recipient while disconnected from the network. When the user roams back into an area of network coverage, the message is transmitted out of storage. The storage of media of incoming messages also allows the recipient to review the messages from storage, in the time-shifted mode, when disconnected from the network.

In other embodiments, the sender and recipient may communicate over a communication network using either a client-server model or a peer-to-peer model. In another embodiment, messages for a recipient may be posted and accessed on a web server. In yet another embodiment, identifiers other than globally unique email addresses may be used for identifying a recipient and for routing purposes. This invention is therefore not limited to the use of globally unique email addresses, but rather, may be used with any type of identifier.

BRIEF DESCRIPTION OF THE DRAWINGS

The invention may best be understood by reference to the following description taken in conjunction with the accompanying drawings, which illustrate specific embodiments of the invention.

FIG. 8 is a diagram illustrating the structure of a conventional email according to the prior art.

FIG. 9 is a diagram of one possible embodiment of a progressive email according to the principles of the present invention.

Throughout the Figures, like reference numbers refer to like elements.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Figure 1:
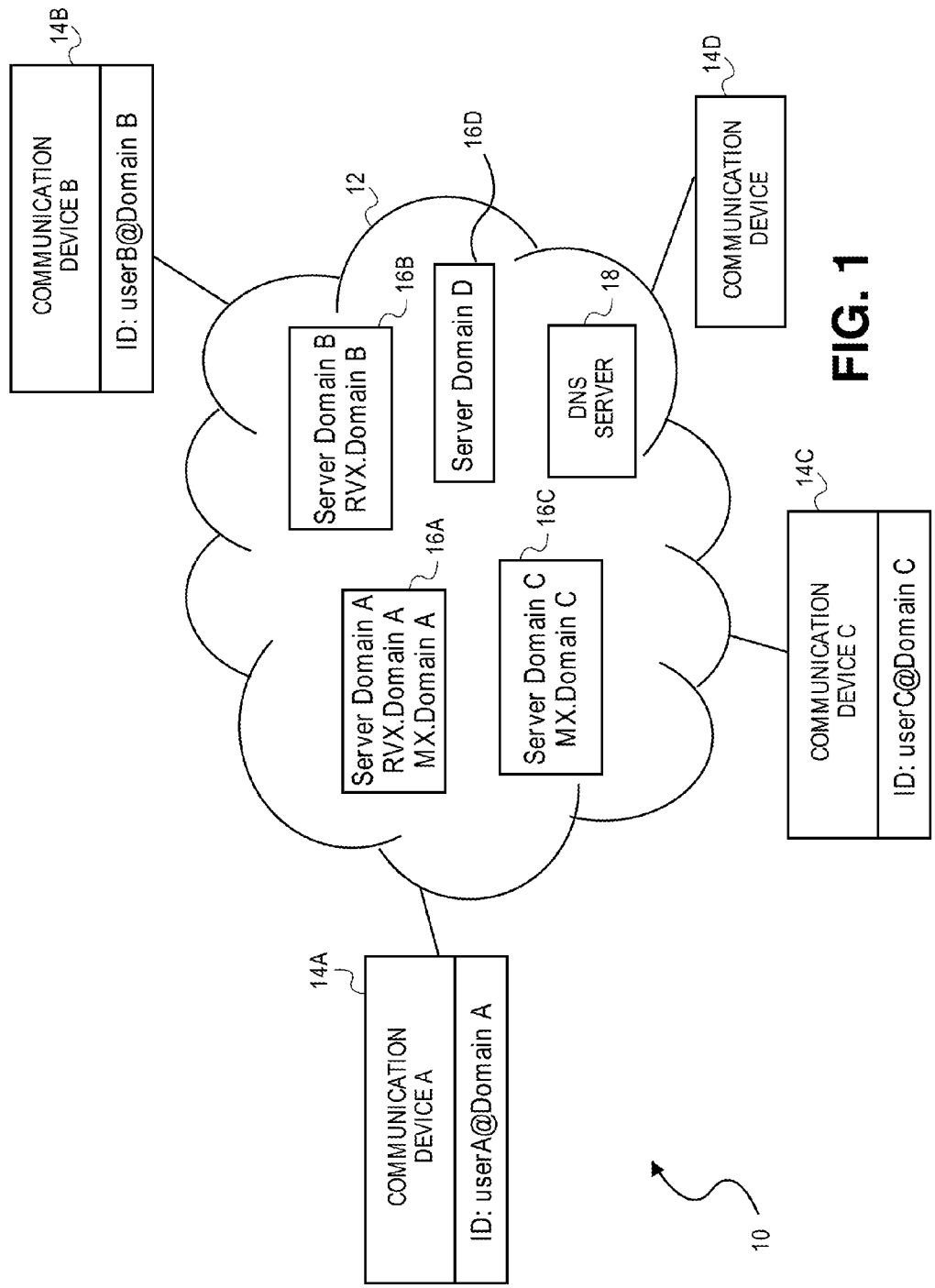
FIG. 1 is a diagram of an exemplary network capable of supporting live or near real-time communication of time-based media between users according to the principles of the invention.

I. The Use of the Email and DNS Infrastructure to Define the Routing for the Delivery of Messages Containing Time-Based Media Using a Near Real-Time Communication Protocol for the Actual Delivery of the Media Referring to FIG. 1, a diagram of a representative network system capable of (i) supporting "live" or near real-time communication of time-based media and (ii) routing using the infrastructure of email and DNS according to one possible embodiment of the invention is shown. The system 10 includes a network 12 with users A, B, C and D using communication devices 14A, 14B, 14C and 14D and Servers 16A, 16B, 16C and 16D located on the network 12. The network 12 further includes a DNS server 18. In various embodiments, the network 12 may include the Internet, an intranet, a mobile IP network, or any other type of network that relies on the Internet Protocol and/or DNS, or any combination thereof. Users A, B and C are each addressed by the servers 16A through 16D by their respective globally addressable email addresses "UserA@Domain A", "UserB@Domain B", and "UserC@Domain C". User D is intentionally not identified on the network 12 by a globally addressable email address for reasons mentioned below.

The Servers 16A, 16B, 16C and 16D are each configured to provide one or more services to Users A, B, C and D respectively. In this example, Server A defines Domain A and provides User A with the standard email delivery service using SMTP (or a similar proprietary or non-proprietary service) and MX DNS records, hereafter referred to as "MX". Server A further provides User A with a real-time communication service, hereafter referred to as "RVX". Server 16B defines Domain B and provides User B with the real-time communication service RVX, but not the email service MX. Server 16C defines Domain C and provides User C with the email service MX, but not the real-time domain RVX service. Server 16D does not provide user D with either the real-time communication service RVX nor the email domain MX service, but possibly other services that are not identified because they are not relevant.

In one embodiment, the real-time service RVX may rely on any communication protocol that allows users to communicate time-based media in near real-time, but does not require the recipient to review the time-based media in a near real-time mode. Known protocols with these properties include the Cooperative Transmission Protocol (CTP) described in detail in the U.S. application Ser. No. 12/028,400 and Ser. No. 12/192,890 or the near real-time synchronization protocol of voice or other time-based media as described in U.S. application Ser. Nos. 12/253,816, 12/253,833 and 12/253,842. The above-listed U.S. applications are assigned to the assignee of the present invention and are incorporated herein by reference for all purposes.

In alternate embodiments, the RVX service may rely on other communications protocols, individually or in combination, that provide near real-time communication, such as SIP, RTP, Skype, VoIP, etc.

The communication devices 14A through 14D may each be any type of communication device, such as land-line telephones, VoIP telephones, cellular radios, satellite radios, military or first responder radios, mobile Internet devices, or just about any other type of communication device. In addition, a given user might have multiple communication devices 14. For example, a user may have one or more of the following; a home computer, a work computer, a Push to Talk radio, a mobile phone or a personal digital assistant (PDA). Regardless of the number of communication devices 14 each user A, B, C and D has, each will operate essentially the same and receive the services provided by the servers 16A, 16B, 16C and 16D as described herein respectively.

It should be noted that the system 10 as illustrated has been greatly simplified compared to what would typically be implemented in actual embodiments. For the sake of illustration, the RVX and MX services as (or not) provided to Users A, B, C and D as listed above have been purposely selected to highlight and describe certain features and principles of the invention. In actual embodiments, however, there would likely be a significantly larger number of users, each with one or more communication devices 14 and associated servers on the network 12, providing a variety of services to each user. In addition, any combination ranging from a single server or a suite of servers 16 may be included on the network 12 to provide the RVX and/or MX for one to multiple users respectively. The communication devices 14A, 14B and 14C and the servers 16A, 16B and 16C may also communicate with one another in a manner similar to that described above using DNS, SMTP, or other proprietary or non-proprietary email protocols for route discovery across one or more hops on the network 12.

The delivery route for a message to a recipient in the same domain is typically delivered to an inbox on the same server 16 or an associated server in the same domain. A message sent to a recipient in another domain will typically be sent to the email server of the recipient via one or more hops across the network 12. With each hop, the media is transmitted using the real-time protocol as soon as the delivery path to the next hop is discovered. If multiple hops are required, then media is typically being transmitted between hops using the real-time protocol before the complete delivery route to the recipient is know (i.e., the path through subsequent hops). This differs significantly from convention emails, where the body of the email is typically first received in full and stored at each hop and forwarded to the next hop only after the route to the next hop is discovered.

Figure 2:
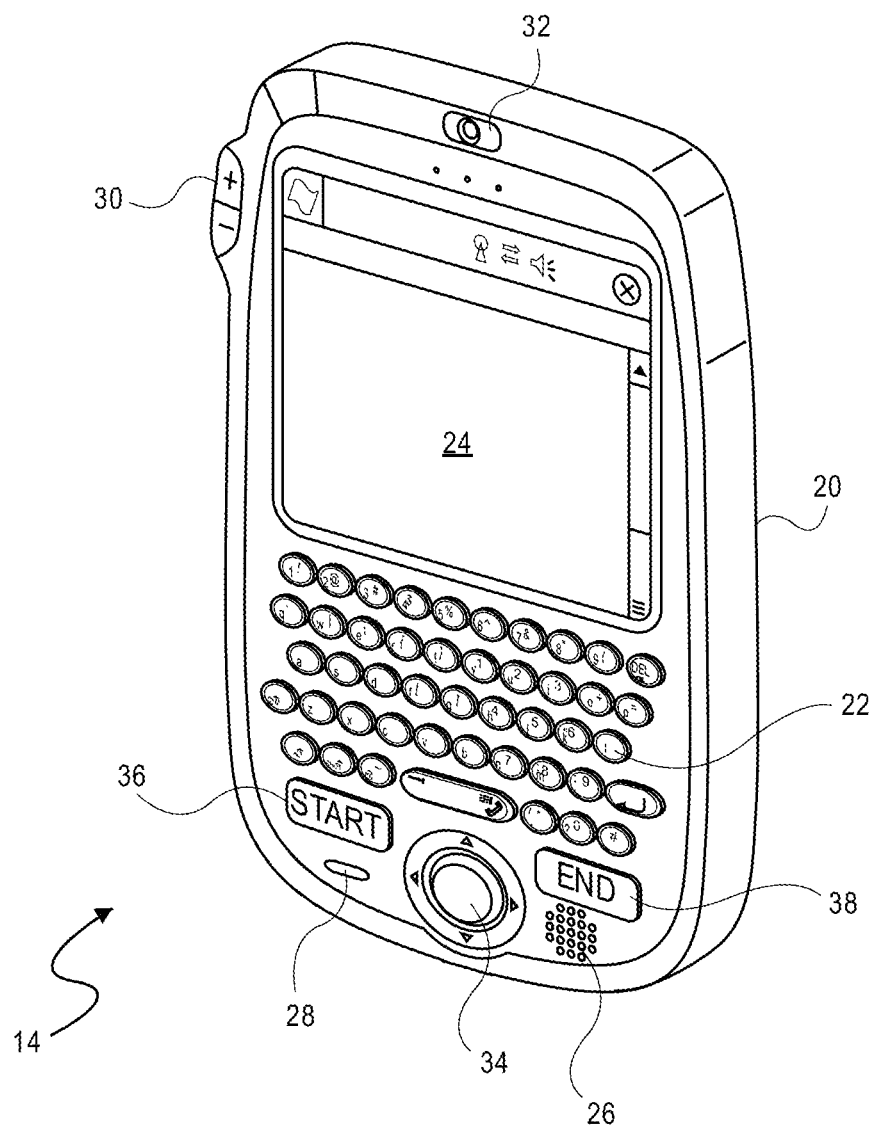
FIG. 2 is a diagram of a first exemplary communication device according to an embodiment of the present invention.

Referring to FIG. 2, a diagram of a communication device 14 according to one embodiment of the present invention is shown. In this embodiment, the communication device 14 is a mobile device 20 capable of wirelessly communicating with the network 12, such as a mobile phone or PTT radio. The mobile device 20 may optionally include one or more of the following; a keypad 22, a display 24, speaker 26, microphone 28, volume control 30, camera 32 capable of generating still photos and/or video, a display control element 34, a start function element 36 and an end function element 38. In various embodiments, the device 20 (i) is IP based, meaning it is designed to communicate over the network 12 using the Internet Protocol and (ii) runs one or more RVX protocols, including any of those listed above or any other near real-time communication protocol. In addition, the mobile device 20 may optionally also locally run an email client, access an email client located on one of the servers 16 located on the network 12, or be capable of both running and accessing an email client on the network.

Figure 3:
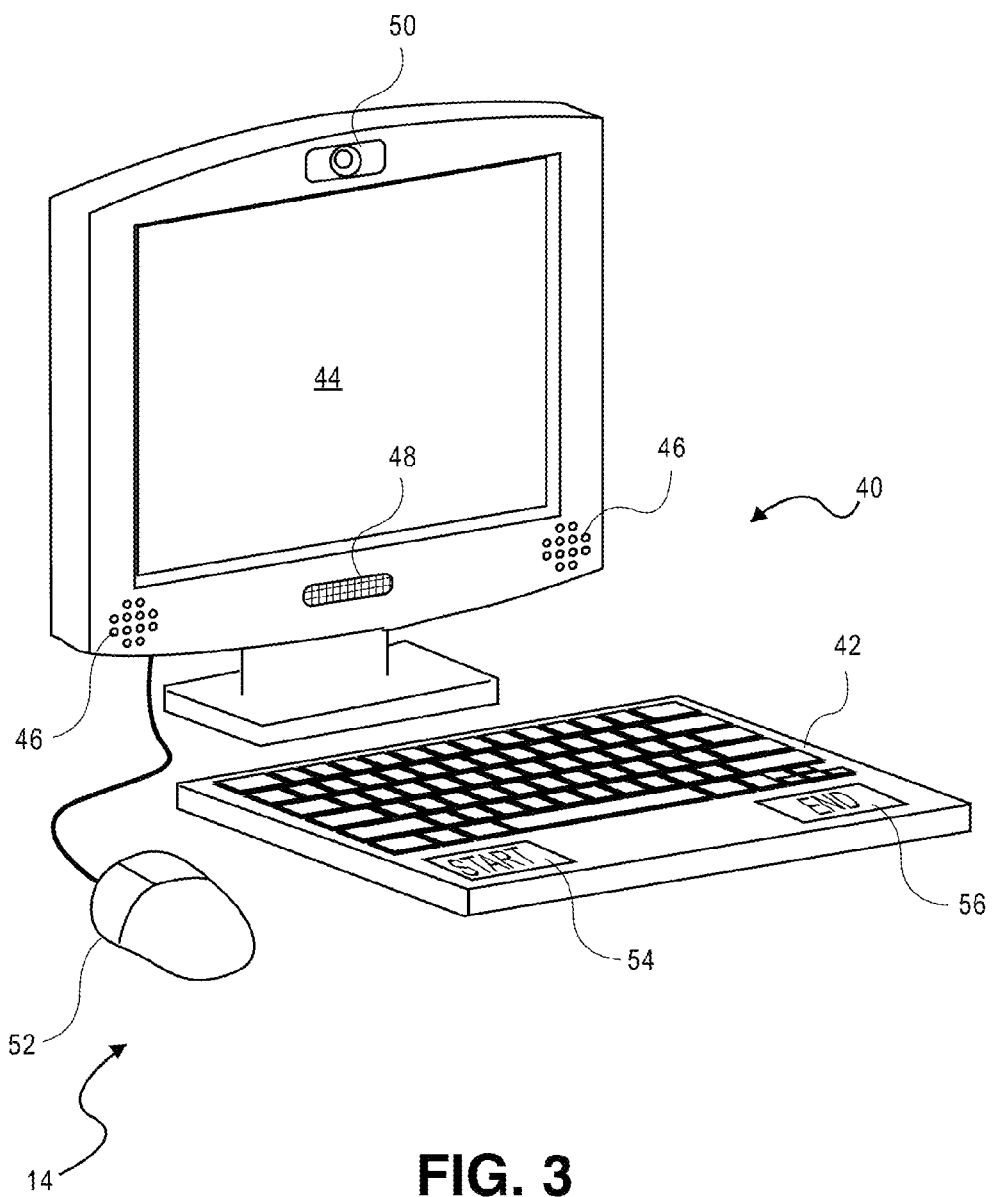
FIG. 3 is a diagram of another exemplary communication device according to another embodiment of the present invention.

Referring to FIG. 3, a diagram of a communication device according to another embodiment of the present invention is shown. In this embodiment, the communication device 14 is a computer 40 connected to the network 12, either through a wired or wireless connection (not shown). The computer 40 optionally includes one or more of the following; a keyboard 42, a display 44, speakers 46, a microphone 48, a camera 50 capable of generating still photos or video, a mouse 52, a start function element 54 and an end function element 56. The computer 40 is capable of running an email client, accessing an email client located on the network 12, or both. In various embodiments, the computer 40 (i) is IP based, meaning it is designed to communicate over the network 12 using the Internet Protocol and (ii) runs one or more RVX protocols, including any of those listed above or any other near real-time communication protocol. The computer 40 could be a portable computer, such as a laptop or personal digital assistant, and is not limited to the desktop computer as shown. In addition, the computer 40 may optionally also locally run an email client, access an email client located on one of the servers 16 located on the network 12, or be capable of both running and accessing email client on the network.

The start function elements 36/54 and the end function elements 38/56 of the mobile device 20 and computer 40 are meant to be symbolic of their respective functions. It is not necessary for mobile device 20, computer 40, or any other type of communication device 14, to physically include start and end buttons per se. Rather, it should be understood that each of these functions might be implemented in a variety of ways, for example, by entering a voice command, a pre-defined keystroke or command using a touch screen or other input device such as a mouse, stylus or pointer, etc. In one specific embodiment, the start and/or end functions may be implemented by default. In other words, the start function may automatically be implemented by the creation of media after the email address of a recipient is defined. For example, a sender may select a recipient from their contacts list, and then begin talking or creating other time-based media. By virtue of defining the recipient and the creation of media, the "start" function 34 may automatically be implemented. Similarly, the end function may be implemented by default. After the sender stops creating media, the end function may automatically be implemented after a predetermined period of time.

In one non-exclusive embodiment, the network 12 uses the existing email infrastructure, including the globally recognizable email addresses of the recipient users and DNS for route discovery, while using a near real-time RVX protocol for the actual transport of messages containing time-based media to the addressed recipient once the route is discovered. Like conventional emails, each message relies on a header that defines, among other things, a globally addressable email address of one or more recipients for routing purposes. Unlike conventional store and forward emails, however, the time-based media of the message is transmitted using a near real-time RVX protocol. As a result, time-based media may be simultaneously and progressively transmitted across the network 12, as the sender creates the media. In addition, the recipient may optionally simultaneously and progressively render the time-based media as it is received over the network.

When two or more parties are conversing (e.g., generating and reviewing time-based media) at approximately the same time, the network 12 is supporting full-duplex, near real-time communication, using one or more RVX protocol(s) for media delivery, while using the existing email infrastructure and DNS for routing. With full duplex real-time communication, the user experience is very similar to a conventional telephone conversation, except the hassles of dialing a telephone number and waiting and listening to the phone ring while a circuit connection is established is avoided.

Alternatively, if the recipient does not reply at approximately the same time, then the user experience is similar to an asynchronous messaging system, such as voice mail, but again without the hassles of dialing the telephone number of the recipient, listening to the phone ring while the establishment of a circuit connection is attempted, and then the eventual rolling-over into the voice mail system of the recipient. On the contrary, the sending party simply has to select or otherwise define the email address of the recipient and then start generating media. The media is routed to the recipient automatically without waiting for a circuit connection to be established.

Figure 4B:
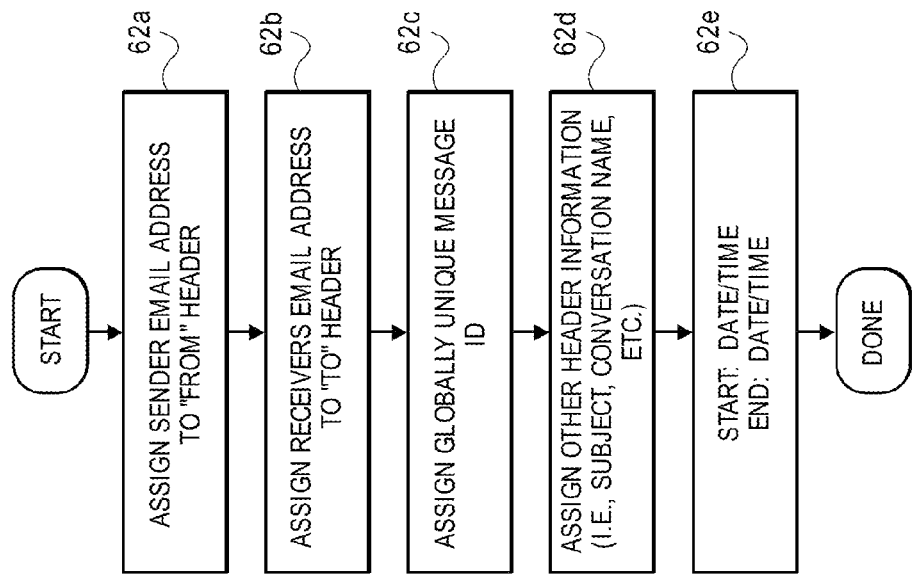
FIGS. 4A and 4B are flow diagrams illustrating one possible example of the sequence for creating an email header on a communication device according to the principles of the present invention.
Figure 4A:
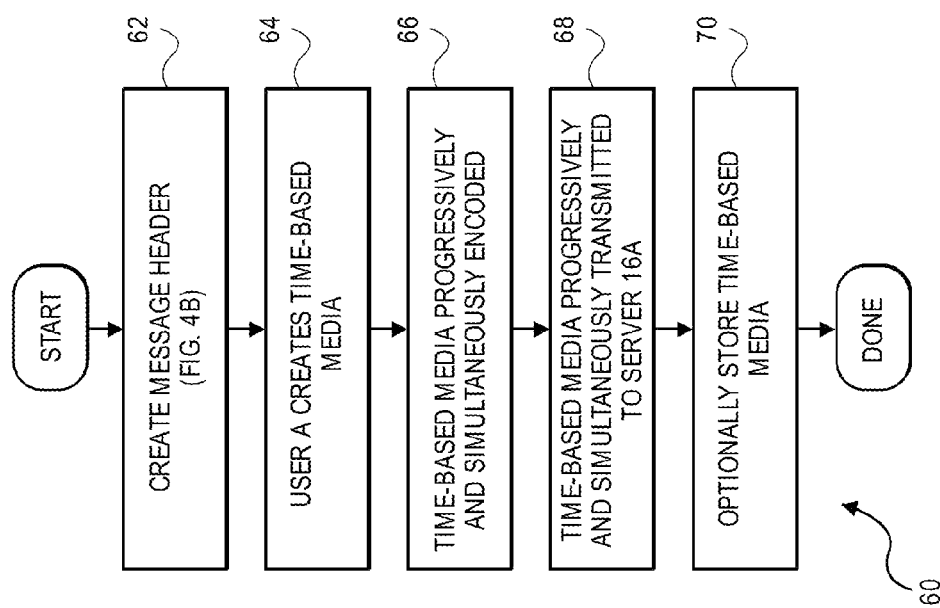

Referring to FIG. 4A, a flow diagram illustrating one possible sequence for creating and transmitting time-based media associated with a message on a communication device 14 in accordance with the principles of the present invention is shown. If the user of a communication device 14 wishes to communicate with a particular recipient, the user will either select the recipient from their list of contacts or reply to an already received message from the intended recipient. Alternatively, the globally addressable email address of the recipient is manually entered into the device 14.

As soon as the email address of the recipient is defined, two operations are performed. A message header is created (step 62) and the defined email address is included in a header field (i.e., the "To", CC, and/or "BCC" field). In addition, the route for delivering the media associated with the message to the globally addressed recipient is immediately discovered using a DNS lookup result. The result can be either an actual DNS lookup or a cached result from a previous lookup. Thereafter, the start function 36/54 is initiated, either manually or by default, and the user may begin creating time-based media (step 64), for example by speaking into the microphone, generating video, or both. The time-based media is then progressively and simultaneously encoded (step 66), transmitted (step 68) over the network 12 using an RVX protocol using the discovered delivery route, and optionally persistently stored on the device 14 (step 70). It should be noted that although these steps 62 through 70 are illustrated in the diagram in a sequence, for all practical purposes, they occur at substantially the same time. As the media is created, the RVX protocol progressively and simultaneously transmits the media across the network 12 to the recipient, as the route is typically discovered without any perceptible delay to the sending user.

The time-based media of outgoing messages may optionally be persistently stored on the sending communication device 14 for a number of reasons. For example, if time-based media of a message is created before the delivery route is discovered, then the time-based media may be transmitted from storage when the delivery route at least to the next hop is discovered. If time-based media is still being created after the route is discovered, then the time-based media is transmitted progressively and simultaneously as the media is being created. Alternatively with the storage of time-based media, the sender may review stored outgoing messages at an arbitrary later time. A message may also be created and stored when the communication device 14 is not connected to the network 12, where connected is defined as the ability to send messages over the network and not connected is defined as the inability to send messages over the network. When the device 14 later connects, the message may be transmitted to the intended recipient from storage, using either an RVX protocol or as an attachment to an email.

Referring to FIG. 4B, a flow diagram 100 illustrating one possible sequence for creating a message header (step 62 in FIG. 4A) in accordance with the principles of the invention is shown. In the step 62a, the globally addressable email address of the sender is provided in the "From" field of the message header. In step 62b, the globally addressable email address of the recipient is entered into the "To" field of the message header. If there are multiple recipients, the email address of each is entered into the "To" field. In additional embodiments, a "CC" or "BCC" field may be used for one or all recipients. In step 62c, a globally unique message ID or number is assigned to the message. In step 62d, other information, such as a conversation name, or the subject of the message, is provided in the header. In step 62e, the start date/time the message was created and possibly the end date/time of the message may be included in the header. In one embodiment, the steps 62a through 62e generally all occur at substantially the same time, with the possible exception of defining the end date/time. In other embodiments, the steps 62a through 62e may occur in any order. The start and end date/times ordinarily coincide with the implementation of the start function 36/54 and end function 38/56 on the sending device 14 respectively.

In certain embodiments, the steps 62a through 62e may be performed on a sending communication device 14. In other embodiments, the sending communication device may send some or all of the message header information to a server 16, where the steps 62a through 62e are performed. The time-based media of the message may also be optionally stored on a server 16 for later review by the sending user or transmission to the recipient.

In the embodiments described above, a message header with various fields including a To, From, Message ID number, Conversation Name, and message Start and End time is provided. It should be understood that not all of these fields are necessary, and other fields may be included. The only required information is at least one recipient specified in one of the To, CC, or BCC fields, which defines the globally addressable email address of a recipient. The other fields are all optional.

The format of the message header is also variable. In one embodiment, the structure of the message header may be similar to that used with conventional emails or the enveloped used with emails. In other embodiments, the structure of the message header may take any form that is suitable for transmitting the globally addressable email address of the recipient(s), along with possibly other header information, across the network 12. While specific email header fields are discussed for specifying recipients, the actual header field containing the recipient address information may not necessarily include the globally addressable email address of the recipient per se. As is well known in the art, an "envelope recipient" may be used to specify the email address of the recipient, even though the envelope recipient may differ from the recipients listed in the email headers. Thus as used herein, the term message header should be broadly construed to include both envelope information and conventional message or email headers including any number of fields, such as but not limited to those specified in RFC 822 or 5322. In addition, the usage of the terms "addressing" or "globally addressable email address" should be broadly construed to include any addressing method, including usage in conventional message or email headers or in a message envelope.

The network 12, under certain circumstances, may deliver messages containing time-based media that can (i) be simultaneously and progressively transmitted to a recipient over the network 12 and (ii) reviewed in near real-time by the addressed recipient as the time-based media is being created and sent by the sending user. Under other circumstances, the messages cannot be delivered in real-time. Both the near real-time and non real-time scenarios are discussed below with regard to FIGS. 5A through 5C respectively.

Figure 5A:
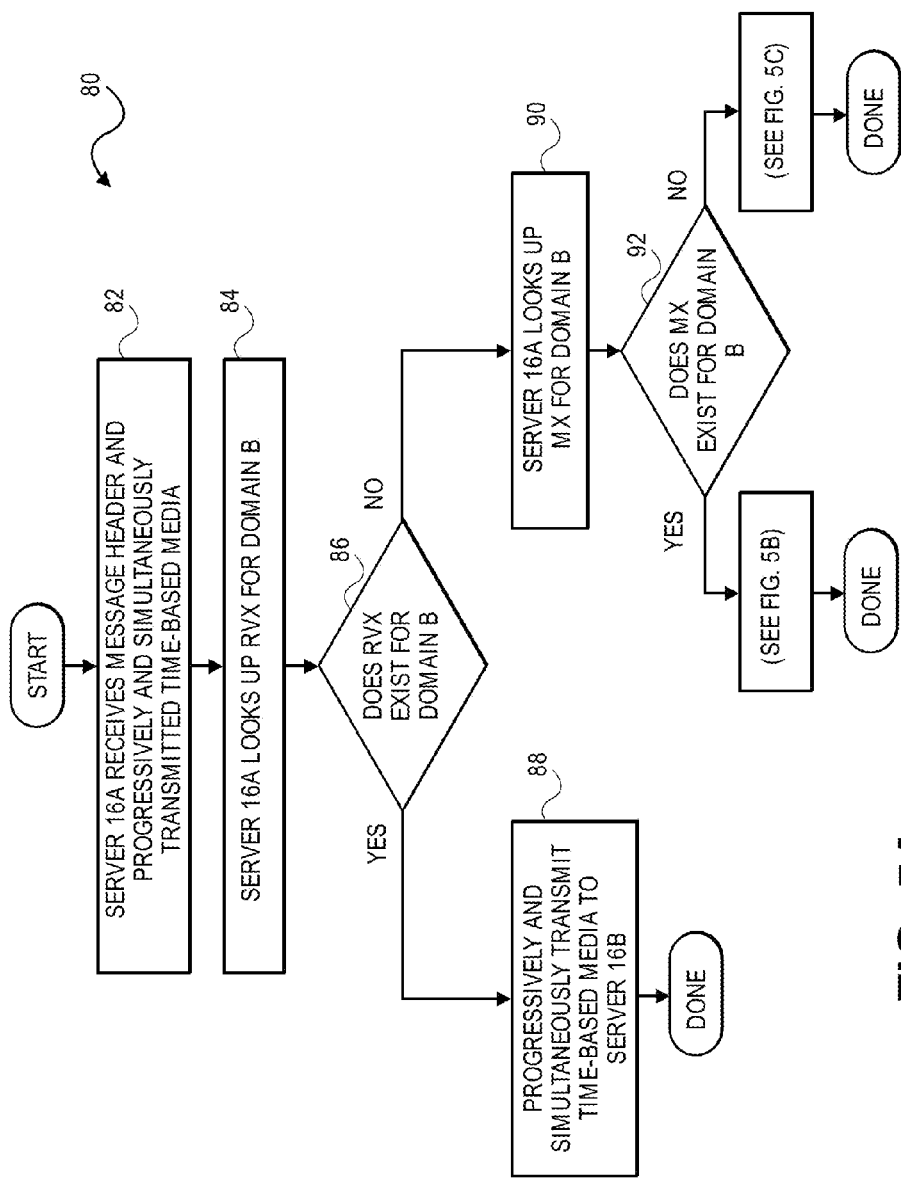
FIGS. 5A through 5D are flow diagrams illustrating possible embodiments of the sequence for conducting communication over a network in accordance with the principles of the present invention.

Referring to FIG. 5A a flow diagram 80 illustrating one possible sequence for conducting near real-time communication with messages containing time-based media in accordance with the principles of the present invention is shown. The sequence is described in the context of user A sending a message to user B using any near real-time RVX protocol. As noted above, server 16B provides user B with an RVX service, but not the MX service. In this example, the steps 62 through 70 as described above with regard to FIGS. 4A and 4B may occur either on the communication device 14A of the sender or the server 16A.

In the initial step 82, server 16A receives the message header (or the header information allowing the server to perform some or all of the steps 62a-62e). As soon as user B's globally addressable email address (userB@DomainB) is received, server 16A requests that DNS server 18 using standard DNS protocols perform a DNS lookup of domain B or accesses a previously cached lookup for the RVX of domain B (step 84). Regardless of how obtained, the result is positive (decision 86) since the RVX exists for domain B. Typically at substantially the same time, the server 16A receives the time-based media of the message. As soon as the delivery path to server 16B is at least partially known, the media is progressively and simultaneously sent using the RVX protocol from the server 16A to server 16B. The time-based media may be transmitted across one or more hops between the two servers 16A and 16B. At each hop, a DNS lookup result is used to discover the delivery route to the next hop, while the RVX protocol is used to deliver the time-based media to each next hop.

In one embodiment, the media is simultaneously and progressively transmitted to the communication device 14B of the recipient when the time-based media arrives at server 16B. The recipient is notified of the incoming message, and in response, the recipient may elect to simultaneously review the media in the near real-time mode as the media of the message is progressively received.

In an alternative embodiment, the media of the message is also optionally placed in an inbox and persistently stored on the recipient device 14B. With the persistent storage of the message, the recipient has the option of reviewing the media in the near real-time mode as the media is received or at an arbitrary later time from storage.

In yet another embodiment, the message may also be stored in an inbox located at the server 16B associated with the user B. In this manner, the user of device 14B may access the message in either real-time or at an arbitrary later time. As noted above, user B is not provided the MX service and therefore cannot receive emails. But in situations where recipient can receive emails, the message can be encapsulated into a file and the file attached to an email that is forwarded to the inbox of the recipient.

In yet other embodiments, the media of the message may be stored in an out-box of the sending user, either located on the user's sending communication device 14A, or on the server 16A associated with the sender.

Figure 5B:
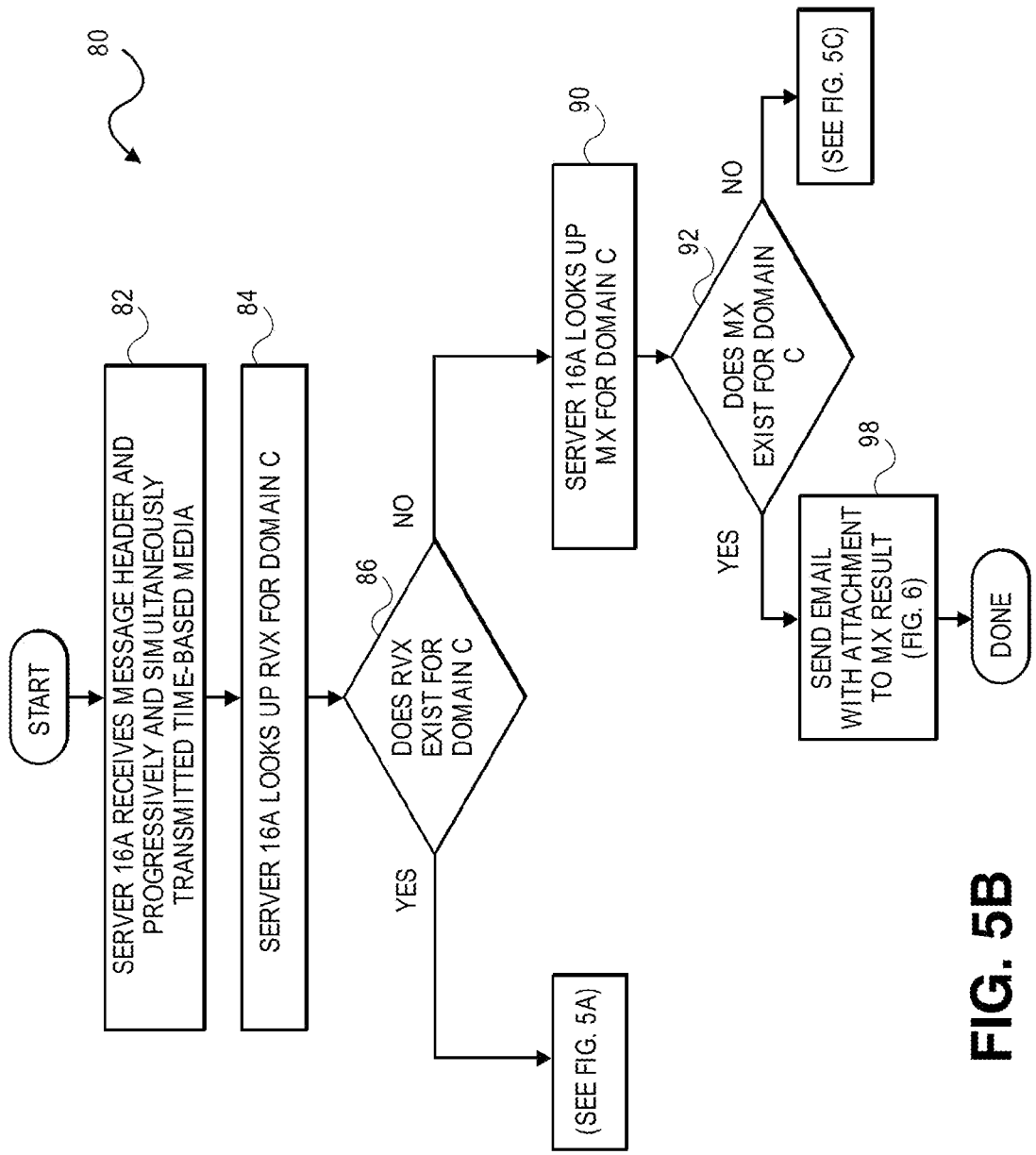

Referring to FIG. 5B, a flow diagram 80 illustrating one possible example of the communication sequence between user A and user C in accordance with the principles of the invention is shown. As previously noted, server 16C provides user C with the MX service, but not a real-time RVX service. When user A wishes to communicate with user C, the initial sequence is essentially the same as that described above. Server 16A initially receives a message header (or the header information necessary to optionally perform steps 62a-62e) with the globally addressable email address of user C (userC@domainC) and the progressive and simultaneous transmission of time-based media by user A (step 82). Since the RVX lookup result (decision 86) is negative, server 16A performs a DNS lookup or uses a previously cached MX lookup for domain C (step 90). With a positive result (decision 92), server 16A sends a conventional email with the time-based media encapsulated as an attachment (step 96) to server 16C. At the server 16C, the email is placed in the recipient's inbox. The email may also be forwarded to an inbox on communication device 14C. Thus, when the recipient does not have the RVX service, the time-based media of the message is sent across the network 12 by Server 16A to server 16C, and possibly communication device 14C, using the store and forward procedure of SMTP or a similar proprietary or non-proprietary email protocol.

Figure 5C:
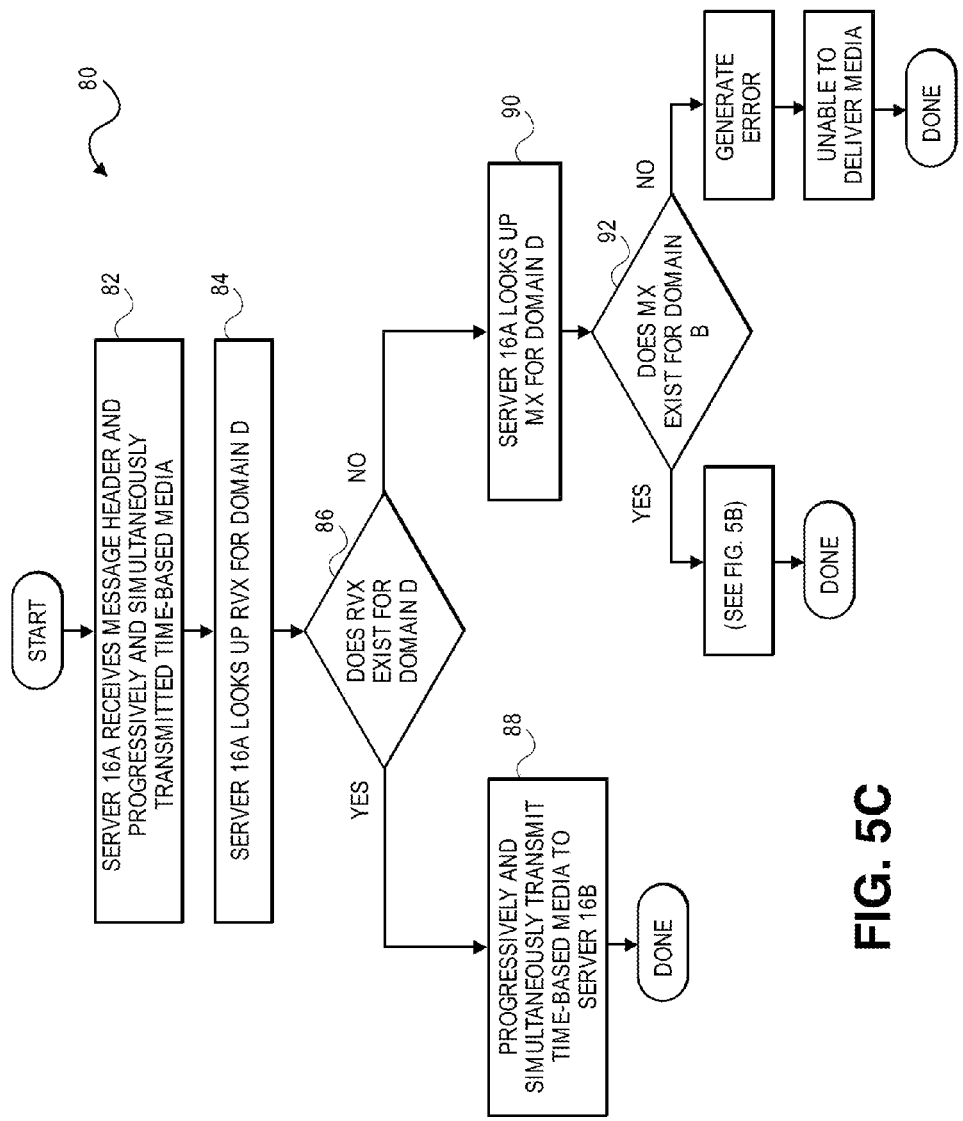

Referring to FIG. 5C, a flow diagram 80 illustrating one possible example of the communication sequence between user A and user D in accordance with the principles of the invention is shown. As previously noted, user D is not provided with either the email MX service or a near real-time RVX service. When user A wishes to communicate with user D, the initial sequence is essentially the same as that described above. Server 16A receives a message header with the globally addressable email address of user D (userD@domainD) and the progressive transmission of time-based media by user A (step 82). Since the RVX lookup (decision 86) and the MX lookup for domain D (diamond 92) are both negative, an error message is generated (step 94) and the message cannot be delivered (step 96). In various embodiments, the time-based media of the message may be stored at either the sending communication device 14A, the server 16A, or both. The message may later be sent when the RVX and/or MX service is provided to user D.

The scenario described with regard to FIG. 5C typically occurs if an incorrect email is provided for a recipient. When the sender attempts to send a message using an invalid email address, the error message (step 94) results. If the correct email address is provided, the message can then be forwarded using either an RVX protocol or as an attachment to an email using the MX service, depending on the services provided to user D.

In an alternative embodiment, the communication devices 14A through 14C may be arranged in a peer-to-peer configuration. With this arrangement, at least the sending communication devices 14 are capable of performing the RVX and/or MX lookups on DNS server 18 directly and caching the results, without the aid of an intervening server 16 to perform the these functions. The communication devices 14 may also be capable of progressively transmitting the media of the messages directly to other communication devices. Depending on whether the recipient is a member or not of the RVX and/or MX domains, the sending communication device 14A will either (i) progressively transmit the time-based media of a message to the recipient over the network 12 as the media is created; (ii) encapsulate the time-based media of the message into a file and transmit an email including the file as an attachment to the recipient using SMTP or a similar proprietary protocol; (iii) or receive an error message if an invalid email address was used.

Figure 5D:
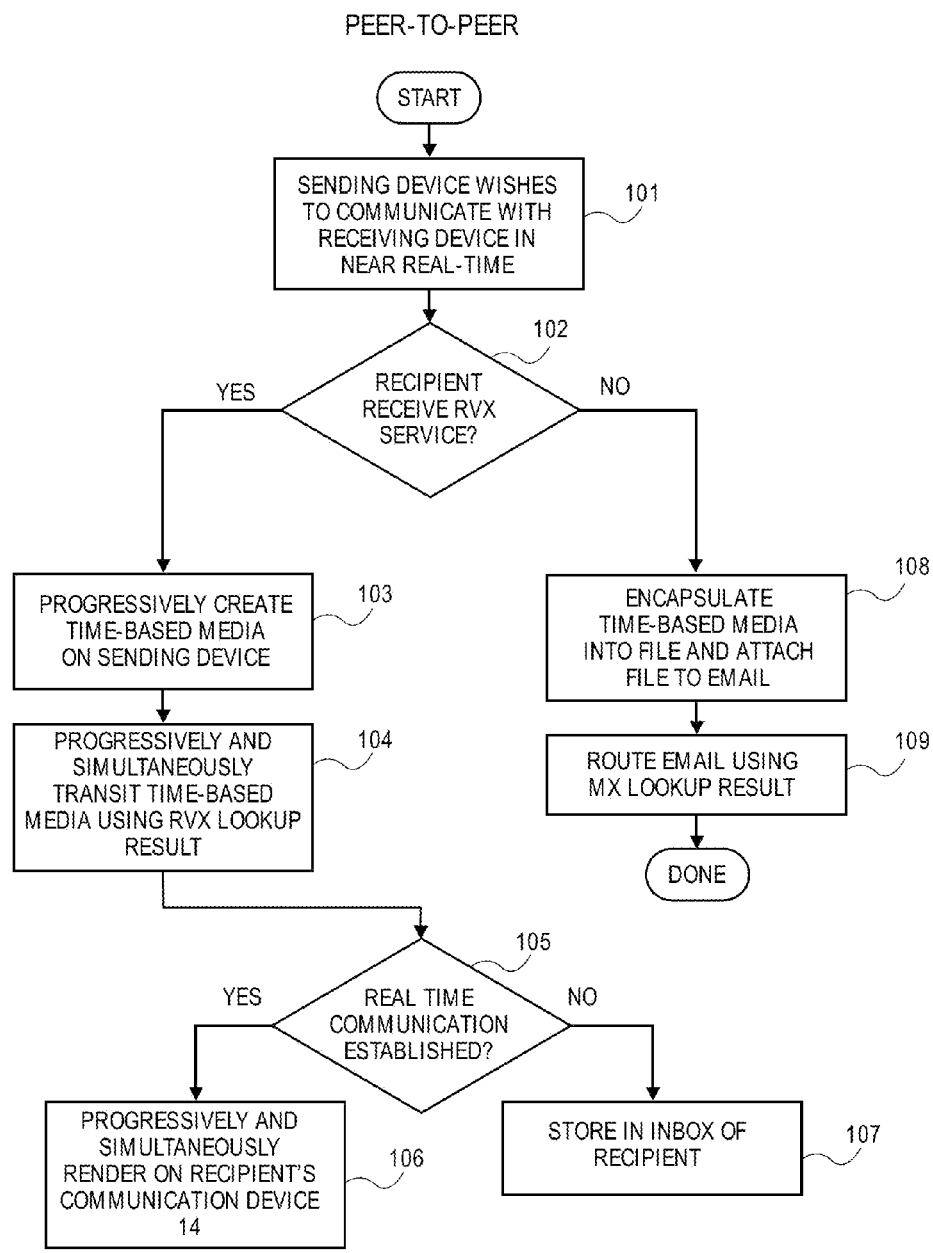

Referring to FIG. 5D, a flow diagram illustrating one possible example of peer-to-peer communication in accordance with the principles of the invention is shown. In the initial step 101, a sending communication device 14 indicates that it would like to communicate with a receiving communication device 14. In decision diamond 102, the communication device 14 of the sender relies on either an actual or cached DNS lookup result of the recipient's globally addressable email address to determine if the peer recipient receives the RVX service. If the result is positive, then the time-based media created (step 103) using the sending communication device 14 is progressively transmitted (step 104) to the recipient as it is created using the delivery route defined by the RVX lookup. In decision diamond 105, it is determined if real-time communication is established. If yes, then the transmitted media is progressively rendered at the communication device 14 of the recipient as the media is received (box 106). If real-time communication is not established, then the media of the message is placed in the inbox of the recipient (box 107), either on the device 14 of the recipient, a server 16 associated with the recipient, or possible both. Real-time communication may not take place with the recipient for a number of reasons, such as the recipient is not available, out of network range, or has indicated a desire to not review the message in the near real-time mode. In another alternative embodiment, the message may always be placed in the inbox of the recipient, regardless if it is reviewed in real-time.

On the other hand, if the recipient does not receive the RVX service (decision 102), then the media of the message is delivered by email, provided the recipient receives the MX domain service. The time-based media is encapsulated into a file and attached to an email (step 108). When the message is complete, the email is transmitted using the route defined by the MX lookup result (step 109) to the inbox of the recipient. In various embodiments, the inbox may be located on the device 14 of the recipient, a server 16 associated with the recipient, or both.

In situations where both peers are running an email client, media may be sent in the form of an attachment to an email from the sending communication device 14 to the receiving communication device 14. This differs from known telephone messaging systems, where a server, as opposed to a sending peer, emails a voice message to the recipient. In certain embodiments, an attachment may be substituted or augmented by a link to a web page containing the time-based media, as described in more detail below.

It should be noted that the discussion above with regard to FIGS. 4A, 4B and 5A through 5C has been simplified to illustrate certain aspects of the invention. It should be understood that actual implementations could be modified in several ways. For example, each time the server 16A received an email address, the server 16A would first determine if the domain of the recipient (i.e., domain A, domain B or domain C), is within one or more local domains of the server 16A. If not, then the procedures described above with regard to FIGS. 5A, 5B and 5C are performed respectively.

On the other hand if the domain of the recipient is within a local domain of the server 16A, then the server 16A may deliver the message directly to the recipient either (i) in real-time if the recipient receives a real-time communication service or (ii) as an attachment to an email if the recipient receives the MX service, but not a real-time service. In addition, it may not be necessary for the Server 16A to perform a DNS lookup in each instance. As is well known, previous DNS lookup results may be cached and used rather than performing a new DNS lookup each time an email address of a recipient is received.

Figure 6:
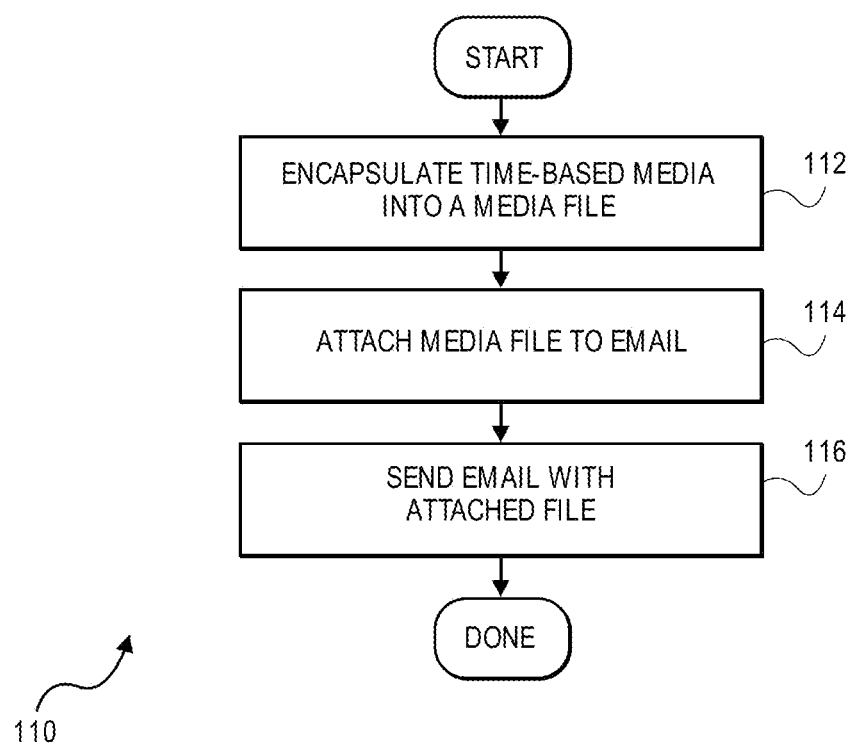
FIG. 6 is a flow diagram illustrating an embodiment for the attachment of a media file to an email in accordance with the principles of the present invention.

Referring to FIG. 6, a flow diagram 110 illustrating one possible sequence for sending time-based media encapsulated in an email attachment in accordance with the principles of the invention is shown. When the time-based media of a message is to be sent in the form of an email (e.g., box 98 in FIG. 5B or box 107 in FIG. 5D), the time-based media generated by user A is first encapsulated in a file (step 112). The file is then attached to the email (step 114) when the message is complete. When the time-based media of the message is complete, the email with the attachment is then transmitted (step 116) to the MX lookup result of the recipient in a manner similar to a conventional email.

With either the server or peer-to-peer models described above, the RVX lookup result is initially used to deliver the time-based media. If the RVX attempt fails, then the MX result is used as a backup. With this arrangement, a conventional email with the time-based media included in an attachment and/or web link is used to deliver the media in circumstances where the recipient is not provided RVX service. The email may be created either on a server or on the sending device.

II. Delivery Options

Figure 7:
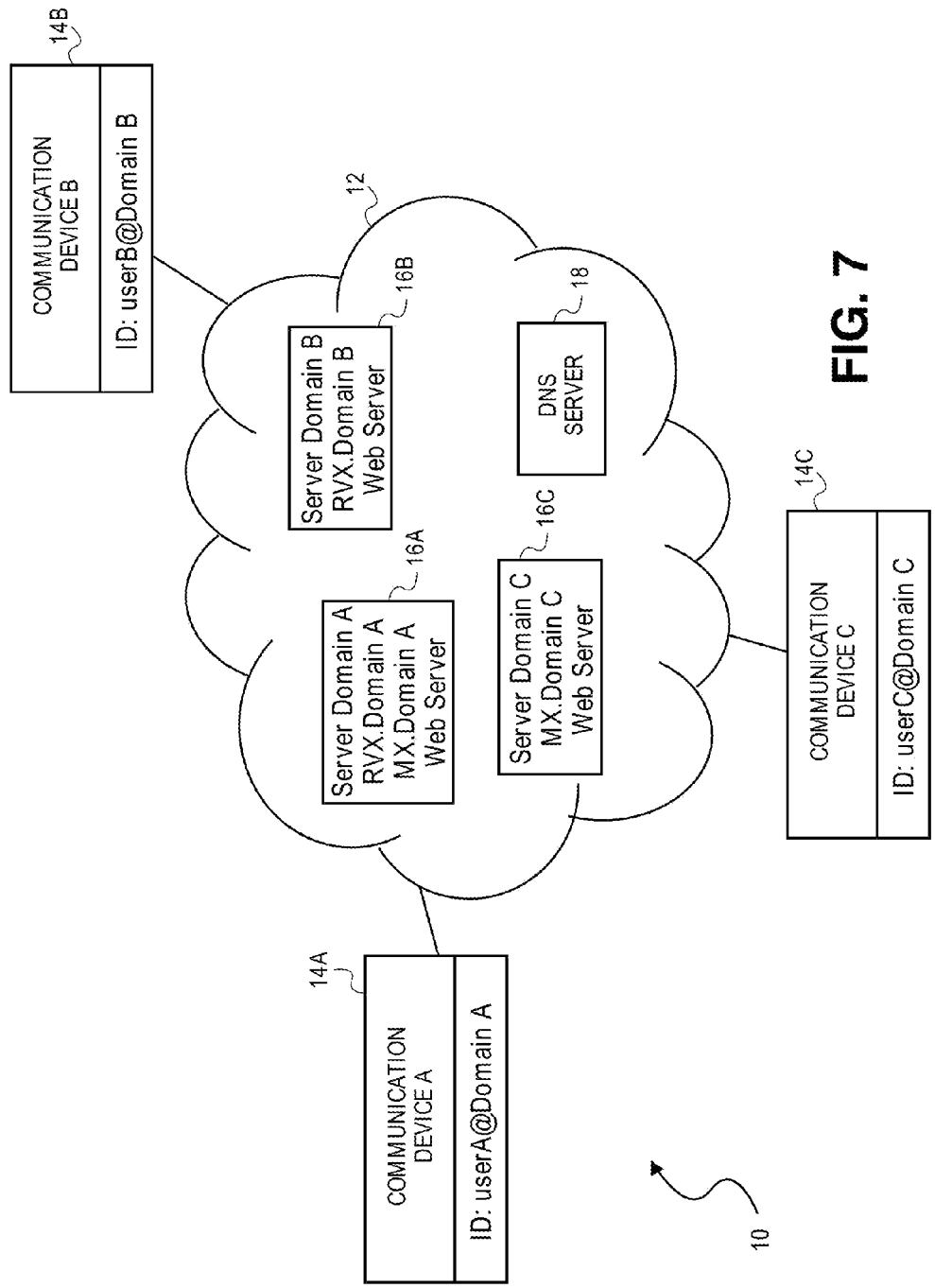
FIG. 7 is a diagram illustrating another embodiment for the delivery of time-based media over the network in accordance with principles of the present invention.

Referring to FIG. 7, a diagram illustrating another embodiment for the delivery of time-based media over the network 12 in accordance with the principles of the invention is shown. With this embodiment, the network 12 is essentially the same as that described above with regard to FIG. 1, with at least one exception. One or more of the servers 16A-16C are configured as web servers, in addition to providing the RVX and/or MX services as described above. With this embodiment, users receive an email from their respective server 16 containing a URL link when a message is sent to them. When the user selects the link through a web browser running on their communication device 14, the appropriate web server 16 serves up web pages allowing the recipient to access and review the message. The served web pages may also provide a variety of rendering options, such as review the media of the message in either the real-time or time-shifted modes, catch up to live, pause a live conversation, jump to the head of a conversation, jump to a previous point in time of the conversation, render faster, render slower, jump between different conversations, etc. In the figure, the web server functionality is provided as one of the services provided by servers 16A, 16B and/or 16C. In an alternative embodiment, the web server functionality can be implemented using one or more other dedicated web servers (not illustrated) on the network 12 besides 16A, 16B or 16C.

III. Email Protocol Modifications and Progressive Emails

The messages as described above are routed using globally addressable email address and the DNS infrastructure for defining a delivery route, while using an RVX protocol for the actual delivery of the time-based media in near real-time. Although the SMTP and other proprietary and non-proprietary email protocols as currently defined and used are essentially store and forward protocols, with certain modifications, these protocols can be used as an RVX messaging protocol for the near real-time delivery of time-based media as contemplated herein. With conventional emails, the media content must be composed in full and packaged before the email can be sent. On the receiving end, the email must be received in full before the recipient can review it. As described in detail below, SMTP, Microsoft Exchange or any other proprietary email protocol may be used for creating "progressive" emails, where media may be sent in real-time.

The existing email infrastructure can be used to support the real-time transmission of time-based media by modifying the way the SMTP, Microsoft Exchange or other proprietary and non-proprietary email protocols (hereafter generically referred to as an email protocol or protocols) are used on the sending side and modifying the way that emails are retrieved from the server on the receiving side. Current email protocols do not strictly require that the entire message be available for sending before delivery is started, although this is typically how email protocols are used. Time-based media can therefore be delivered progressively, as it is being created, using standard email protocols.

Email is typically delivered to a recipient through an access protocol like POP or IMAP. These protocols do not support the progressive delivery of messages as they are arriving. However, by making modifications to these access protocols, a message may be progressively delivered to a recipient as the media of the message is arriving over the network. Such modifications include the removal of the current requirement that the email server know the full size of the email message before the message can be downloaded to the client. By removing this restriction, a client may begin downloading the time-based media of an email message as the time-based media of the email message is received at the server over the network.

Referring to FIG. 8, the structure of a conventional email 120 according to the prior art is illustrated. The email 120 includes a header 122 and a body 124. The header includes a "To" (or possibly the CC and/or BCC fields) field, a "From" field, a unique global ID number, a subject field, optional attachments, and a date/time stamp. The body 124 of the email includes the media to be transmitted, which typically includes a typed message and possibly attached files (e.g. documents or photos). When complete, the email is transmitted by implementing a "send" function or command A DNS lookup of the email address of the recipient is then performed and the email is routed to the recipient. Conventional emails are "static", meaning the body of the email, including attachments, must be created before transmission may begin. Once transmission starts, the contents defined in the body is fixed, and cannot be dynamically altered or updated. As a result, there is no way to progressively transmit with conventional emails time-based media as the media is being created. Prior art emails 120 are therefore incapable of supporting near real-time communication.

Referring to FIG. 9, one possible embodiment of a "progressive" email 130 according to the principles of the invention is shown. The email message 130, which is capable of supporting real-time communication, includes a header 132 including a "To" field (and possibly CC and/or BCC fields) and a body 134. The structure of email 130 differs from a conventional prior art email 120 in at least two regards. First, the header 132 includes an email Start date/time and an End date/time. By associating a start and end time with an email 130, as opposed to just a date/time stamp when an email 120 is sent, the second difference may be realized. As soon as the email address of the recipient is defined, the delivery path to the next hop or hops is immediately ascertained, using a DNS lookup result of the defined email address. Again, the lookup result can be either an actual or a previous result that is cached. As the delivery route from hop to hop is discovered, time-based media may be progressively transmitted as it is created, using the streaming nature of SMTP, Microsoft Exchange or any other type of email protocol. The body 134 of email 130 is therefore "progressive". As the time-based media associated with an email message 130 is dynamically created, the time-based media is progressively transmitted to the email server of the recipient. If an email 130 is sent to multiple recipients, regardless if identified in the To, CC or BCC fields, the above process is repeated for each.

With progressive emails 130, an email protocol session is established with the email server associated with the sender as soon as the email address of the recipient is defined. This differs from conventional emails 120, where the email protocol session is typically initiated only after the email has been composed in full and the sender implements the "send" function. As a result, the delivery route can be discovered either before or concurrent with the progressive transmission of time-based media as it is being created. In situations where the time-based media may be created before the session is established, the time-based media may be temporarily and/or persistently stored as the media is created. The stored media may then be progressively transmitted from storage once the protocol session with the email server is established.

The End date/time of email 130 may be either defined or open-ended. When the sender actively implements the end function 38/56 on the communication device 14, then the end time of the email 130 is defined. If the end function 38/56 is never implemented, then the duration of the email 130 is "open-ended" and does not necessarily have a defined end date/time. Open-ended emails 130 are therefore typically terminated by default after a predetermined period of time where no media is created.

In summary, progressive emails 130 can be sent using SMTP, Microsoft Exchange or any other proprietary or non-proprietary email protocol by implementing the above-described modifications. Similarly, recipients may simultaneously and progressively review the time-based media of progressive emails 130 by modifying access protocols such as POP, IMAC and the like. Together, these modifications enable the use of email addressing, email protocols, DNS and DNS protocols, and the existing email infrastructure to support real-time communication of time-based media.

IV. Late Binding of Recipient Addresses for Real-Time Voice and Other Time-Based Media With the messages (as described with regard to FIGS. 4A, 4B and 5A-5D) or progressive emails 130 described above, a user addresses a recipient using their globally addressable email address and then immediately begins talking or generating time-based media. With each embodiment, the delivery route is immediately discovered as soon as the email address of the recipient is defined. Time-based media is progressively transmitted along the delivery route as it is discovered as the media is created. Consequently the discovery of an active delivery route and the progressive creation, transmission and delivery of the time-based media may occur in real-time. In the event the actual delivery route is discovered after the creation of time-based media has started, then the media may be temporarily and/or persistently stored and then transmitted from storage once the active delivery route is defined. No network connection or circuit needs to be established before the sender may start talking or creating other media. The ability to progressively and simultaneously transmit the time-based media using DNS and the infrastructure of email therefore enables the late binding of recipient addresses for voice and other time-based media in a manner that previously was not possible.

V. Conversations

The messaging methods and systems as described (with regard to FIGS. 1-3, 4A-4B, 5A-5D or FIG. 9) are each conducive for supporting conversations between sending and receiving users. When two or more parties are conversing back and forth using any of the above-listed RVX protocols or progressive emails 130, then the conversation may take place (i) in the near real-time mode; (ii) the time-shifted mode; or (iii) seamlessly transition between the two modes. When two or more participants are conversing in the real-time mode, the user experience is similar to a conventional full duplex telephone conversation. In the time-shifted mode, the user experience is similar to an asynchronous messaging system. As described in more detail in the above-mentioned U.S. applications, the media may be rendered using a number of different rendering options, such as play, catch up to live, pause a live conversation, jump to the head of a conversation, jump to a previous point in time of the conversation, render faster, render slower, jump between different conversations, etc. By using certain rendering options, a user may seamlessly transition a conversation from the time-shifted mode to the real-time mode and vice versa.

Regardless of the embodiment, the "reply" function may be implemented in a variety ways. For example, the recipient may enter an explicit reply command into their communication device 14, such as by using a predefined voice or keystroke command, or entering a command through a touch screen. Alternatively, a reply message or email may be generated automatically when the recipient begins speaking or generating other time-based media in response to a message or email 130. When a reply message is automatically created, the email address of the original sender is used for addressing the reply message.

In yet other embodiments, the RVX protocol used for sending and receiving the messages of a conversation between participants in the real-time mode do not necessarily have to be the same. For example, one participant may send messages using one of the CTP, synchronization, progressive emails 130, VoIP, SIP, RTP, or Skype protocols, whereas other participants may use a different one of the listed protocols, provided some type of a common conversation identifier is used. Any messages, regardless of the protocol used for transmission, are linked or threaded together using the unique conversation identifier.

In various further embodiments, conversations can be defined using a variety of criteria. For example, conversations may be defined by the name of a person (e.g., mom, spouse, boss, etc) or common group of people (e.g., basketball team, sales team, poker buddies, etc). Conversations may also be defined by topic, such as fantasy football league, ACME corporate account, or "skunk works" project. Regardless of the contextual attribute used to define a conversation, the ability to link or organize the messages of a particular conversation together creates the notion of a persistent or ongoing conversation. With a conventional telephone call, the conversation typically ends when the parties hang up. There is no way to contextually link, organize and possibly store the spoken words of multiple telephone exchanges between the same parties. On the contrary, conversations, as defined herein, are a set of common messages linked together by a common attribute. So long as messages are added to the conversation, the conversation is continuous or ongoing. This attribute makes it possible for a participant to contribute to a conversation at any arbitrary time. For example, a user may select a conversation among a list of conversations and contribute a message to the selected conversation at anytime. The message is then sent to all the conversation participants. Messages are therefore not necessarily sent when either a conversation is first created or in reply to an incoming message.

VI. Implementation Embodiments

The messaging methods as described with regard to FIGS. 1-3, 4A-4B and 5A-5D and progressive emails 130 may be implemented in a variety of ways. For example, cell phone and other mobile communication service providers may provide users with peer-to-peer mobile communication devices that operate using either messages and/or progressive emails 130. In addition, these service providers may also maintain a network 12 of servers 16 for conveying messages between users as described herein using one or more RVX protocols.

In yet another embodiment, the messaging and progressive email 130 methods may be embedded in a software application that is intended to be loaded into and executed on conventional telephones, mobile or cellular telephones and radios, mobile, desktop and laptop computers. In each of these cases, the application enables the device to send, receive and process messages and progressive emails 130 as described herein.

In yet other implementations, conventional email clients can be modified to create, receive and process progressive emails 130. The modified email client may alternatively reside on a server on the Internet or other proprietary or non-proprietary network, on sending or receiving devices, or both.

Although the above-described systems and methods were generally described in the context of a single sender and a single recipient (as discussed with regard to FIGS. 4A-4B and 5A-5D) or emails 130 to a single recipient, it should be understood the messages and/or emails 130 might be simultaneously sent to multiple parties. Each recipient will either receive or not receive the message or email, depending on their status, as described above.

Also although the above-described email methods were generally described in the context of "globally" unique identifiers, such as an email address, it is necessary to note that such identifiers do not necessarily have to be a global. In alternative embodiments, the identifier may uniquely identify a user within a defined non-global community of users. For example, a community, such a social networking website, may issue each user a unique identifier within the community. Users within the community can then communicate with one another, as described herein with regard to FIGS. 1 through 10. The unique identifier assigned to each user is used to not only authenticate each user, but also for routing messages and media between users. Accordingly the term "identifier" as used in this application is intended to be broadly construed and mean both globally and non-globally unique identifiers.

It also should be noted that the system and methods as described herein are not intended for use with only "live" real-time transmission. The aforementioned systems and methods as described with respect to FIGS. 1 through 3, 4A-4B, 5A-5D and 9 may also be used with the real-time transmission of previously created and stored time-based media. As the media is retrieved from storage, it is progressively transmitted as the delivery route to the recipient is discovered, as described in detail above.

The time-based media exchanged by the messages and/or emails is not limited to just voice or video. In addition, the time-based media may be delivered to a recipient in a different form than it was created. For example, a voice message may be transcribed into a text file or a message in English may be translated into another language before being delivered to the recipient. Any media that varies over time, such as sensor data, GPS or positional information, may also be transmitted.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the invention, as provided in the attached claims.

What is claimed is:

1. A method performed at a node on a network for progressively receiving, storing and forwarding a video message from a sender to a recipient over the network, comprising:
   receiving at the node an identifier contained in a message header of the video message, the identifier identifying a recipient of the video message;
   ascertaining an address for identifying a communication device associated with the recipient on the network from the identifier contained in the message header of the video message;
   progressively receiving video media contained in a message body of the video message as the video media is created and progressively transmitted by the sender;
   progressively and persistently storing the video media contained in the message body as the video media is received at the node; and
   starting progressive transmission of the video media of the video message to the recipient as the video media is received and persistently stored, before the video media contained in the message body is complete, using a delivery route for delivering the video media over the network to the communication device associated with the recipient that is discovered using the ascertained address for the communication device.

2. The method of claim 1, wherein starting the progressive transmission of the video media of the video message to the recipient further comprises progressively transmitting the video media over the network as one or more hops along the delivery route to the communication device associated with the recipient is/are discovered.

3. The method of claim 1, wherein the address of the communication device is ascertained from a lookup result of the identifier that is either:
   (i) an active lookup result of the identifier associated with the recipient; or
   (ii) a cached result of a previous lookup of the identifier.

4. The method of claim 1, wherein the identifier is defined by the sender in one of the following ways:
   (i) by selecting the recipient from a list of contacts;
   (ii) the manual entry of the identifier of the recipient;
   (iii) implementing a reply function in response to the receipt of a previous message; or
   (iv) selection of a conversation in which the recipient is a participant.

5. The method of claim 1, further comprising, after the start of the progressive transmission, progressively transmitting the video media to the communication device associated with the recipient in real-time as the video media is created by the sender using a sending communication device.

6. The method of claim 1, wherein the identifier is assigned to the recipient and is used to uniquely identify the recipient among a community of users.

7. The method of claim 1, further comprising enabling the recipient to access the video message from persistent storage on the network at a time after the video message is created and sent by the sender.

8. The method of claim 1, wherein the start of the progressive transmission of the video media of the video message by the node to the communication device associated with the recipient supports the near real-time delivery of the video media of the video message to the recipient without first requiring a synchronous connection over the network between a sending communication device associated with the sender and the communication device associated with the recipient.

9. The method of claim 1, wherein the message body is dynamic having a duration that dynamically extends to contain the video media of the video message for the duration of the video message.

10. The method of claim 1, wherein the video message is created and sent to a plurality of recipients and each of the plurality of recipients is targeted for receipt of the video message by inserting a unique identifier for each of the plurality of recipients in the message header respectively.

11. The method of claim 1, wherein the progressive transmission of the video media of the video message enables the recipient to view the video media of the video message on the communication device substantially live, as the video media is created, but delayed by the latency of the network.

12. The method of claim 1, wherein ascertaining the address for the identifying the recipient further comprises ascertaining a current IP address on the network for the communication device associated with the recipient.

13. The method of claim 1, further comprising at least separately processing the message header and the message body of the video message at the node on the network by ascertaining the address for identifying the communication device associated with the recipient using the identifier in the message header before receiving the video media contained in the message body in its entirety.

14. The method of claim 1, wherein the start of the progressive transmission of the video media of the video message by the node enables the recipient to view the video media of the video message on the communication device associated with the recipient substantially live as the video media is created and transmitted by the sender.

15. The method of claim 1, wherein the video message is sent by the sender using a sending communication device without having to first notify the recipient or to receive agreement from the recipient to send the video message.

16. An application, embedded in a non-transitory computer readable medium and intended to be executed on a communication device connected to a network, the application configured to:
   receive input from a user for initiating creation of a video message to a recipient;
   create, in response to the received input from the user, the video message on the communication device, the video message having a message header containing an identifier associated with the recipient of the video message and a message body for transporting video media associated with the video message;

transmit the message header to a node on the network after the identifier is defined, the node on the network using the identifier to ascertain an address on the network for a second communication device associated with the recipient from the identifier; and progressively transmit the video media of the message body to the node on the network, as the video media is created and added to the message body, so that the node can progressively transmit the video media of the video message, as the video media is received at the node, to the recipient over the network using a delivery route to the second communication device that is discovered using the ascertained address and without first establishing an end-to-end connection over the network between the communication device and the second communication device associated with the recipient before the transmission starts, wherein the message header containing the identifier associated with the recipient of the video message is transmitted to the node on the network before the video media added to the message body is complete.

17. The application of claim 16, further configured to progressively transmit the video media in the message body through the node to the second communication device associated with the recipient as the video media is created and as one or more hops on the network is/are discovered using the ascertained address.

18. The application of claim 16, further configured to use an IP transmission protocol that supports real-time communication for the progressive transmission of the video media of the video message.

19. The application of claim 16, wherein the identifier uniquely identifies the recipient within a community of users on the network.

20. The application of claim 16, wherein the address of the second communication device is ascertained from a lookup result of the identifier.

21. The application of claim 16, wherein the identifier is a non-IP address identifier that is resolved into an IP address for the second communication device on the network.

22. The application of claim 16, further configured to define the identifier in accordance with one of the following:
   (i) in response to a selection of the recipient from a list of contacts;
   (ii) in response to a manual entry of a name associated with the recipient; or
   (iii) by selecting a reply function in response to a previous message.

23. The application of claim 16, further configured to transmit the video message to the recipient over the network as the video media is created so that the recipient can render the video media in real-time at the second communication device.

24. The application of claim 16, further configured to progressively receive over the network at the communication device an incoming video message.

25. The application of claim 24, further configured to selectively enable rendering of the video media of the incoming video message in both:
   (i) a real-time mode as the video media of the incoming video message is progressively received; and
   (ii) in a time-shifted mode by retrieving and rendering the video media of the incoming video message from storage.

26. The application of claim 16, further configured to start the progressive transmission of the video media of the video message to the node before the delivery route to the second communication device is known.

27. The application of claim 16, further configured to start the progressive transmission of the video media of the video message to the node independent of the node on the network determining the delivery route to the second communication device.

28. The application of claim 16, further configured to start the progressive transmission of the video media of the video message to the node regardless if the second communication device is available or is not available on the network.

29. The application of claim 16, further configured to at least separately process the message header and the message body of the video message at the communication device by transmitting the identifier in the message header to the node before the video media contained in the message body is complete.

30. The application of claim 16, wherein the application is further configured to enable the sender to send the video message using the communication device without having to first notify the recipient or receive agreement from the recipient to send the video message.

* * * * *